United States Patent [19]

Bourbeau

[11] 4,364,004
[45] Dec. 14, 1982

[54] SELF-CONTROLLED POLYPHASE SYNCHRONOUS MOTOR DRIVE SYSTEM

[76] Inventor: Frank J. Bourbeau, 5411 Toltec Dr., Santa Barbara, Calif. 93111

[21] Appl. No.: 116,578

[22] Filed: Jan. 29, 1980

[51] Int. Cl.³ .................... H02P 1/46; H02P 5/36; H02P 7/58
[52] U.S. Cl. .................... 318/721; 318/722; 318/802; 318/811
[58] Field of Search .......... 318/714, 715, 716, 717, 318/718, 719, 720, 721, 722, 723, 798, 799, 800, 801, 802, 803, 810, 811, 813

[56] References Cited

U.S. PATENT DOCUMENTS

| | | | |
|---|---|---|---|
| 3,777,250 | 12/1973 | Kaeser et al. | 363/161 |
| 3,793,573 | 2/1974 | Tsuboi | 318/722 X |
| 3,872,364 | 3/1975 | Hübner | 318/721 X |
| 3,894,277 | 7/1975 | Tachibana et al. | 318/721 X |
| 3,997,825 | 12/1976 | Miyasita et al. | 318/713 |
| 4,088,932 | 5/1978 | Okuyama et al. | 318/721 X |

Primary Examiner—Stanley J. Witkowski
Assistant Examiner—Richard M. Moose
Attorney, Agent, or Firm—Daniel J. Meaney, Jr.

[57] ABSTRACT

A self-controlled polyphase synchronous motor drive system having means for producing rotor digital timing signals representative of the position of the rotor relative to the stator, means for producing pulse width modulation control signals wherein the pulse width thereof is responsive to a motor power factor command signal, a plurality of phase control means equal in number to the number of phases of the polyphase stator and responsive to the variable pulse width modulation control signals and including means for producing a modulated analog reference signal from one of two selected stator voltages and means for summing the amplitude modulated analog reference signal with an unmodulated analog reference signal produced from the other of the two selected stator voltages and for comparing the sum thereof with a threshold voltage signal to produce as an output therefrom two motor voltage derived digital timing signals for each phase of the polyphase stator in response to the speed of the motor such that an absence of voltage digital timing signals occurs at zero motor speed and voltage digital timing signals having distortion is produced at low motor speeds and digital gating command signal generating means responsive to the voltage digital timing signals from each of the phase control means and to the rotor digital timing signals for producing digital gating command signals having a leading edge determined by one of the voltage digital timing signals or that of a selected one of the rotor digital timing signals and the width of which is equal to 360 degrees divided by the number of phases of the polyphase stator is shown.

A commutation margin detecting circuit and rotor position sensing circuit are also shown.

15 Claims, 17 Drawing Figures

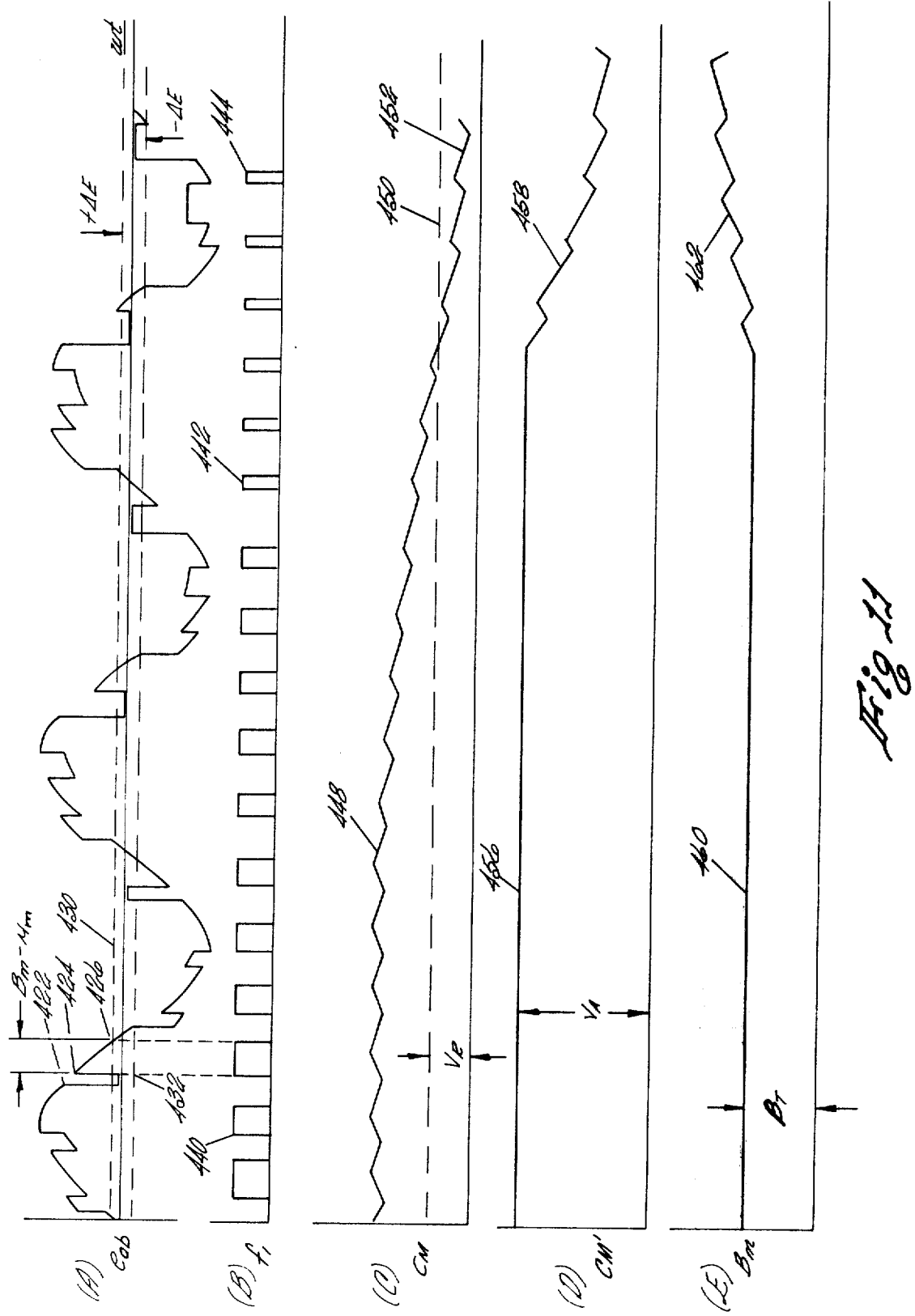

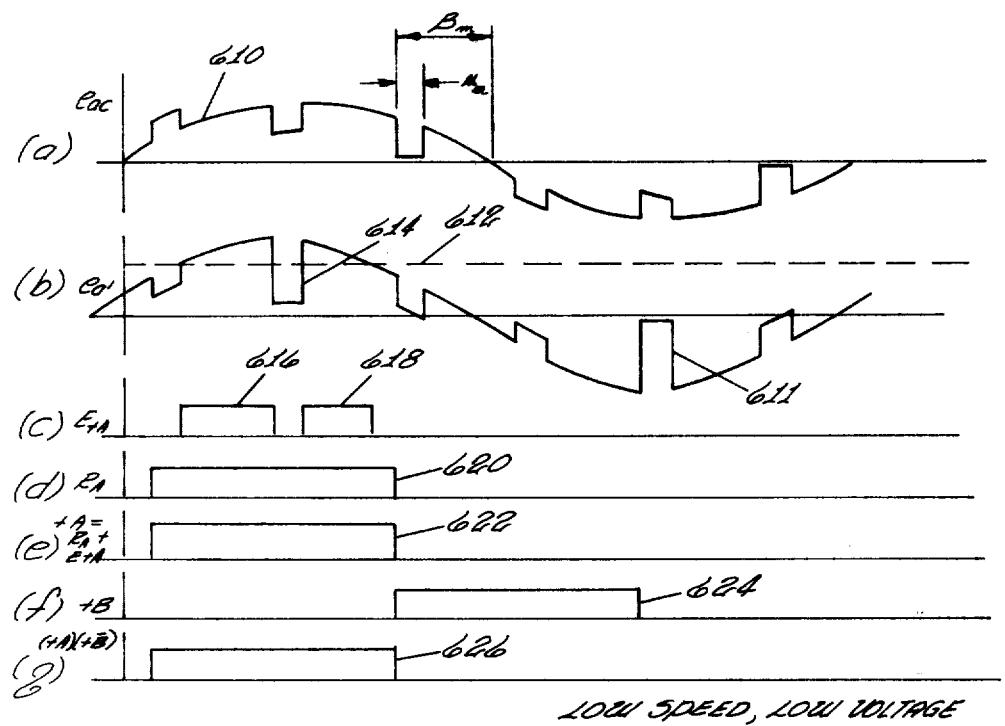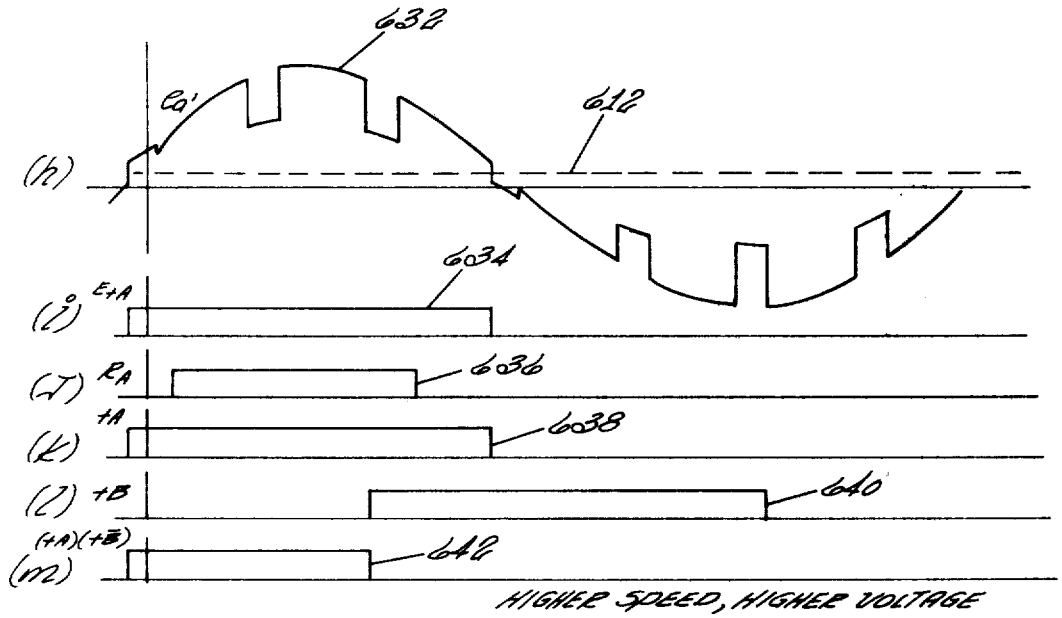
Fig. 17

SELF-CONTROLLED POLYPHASE SYNCHRONOUS MOTOR DRIVE SYSTEM

BACKGROUND OF THE INVENTION

1. Field of the Invention

This invention relates to a self-controlled polyphase synchronous motor drive system in which current applied to a polyphase stator is provided by a rectifier-inverter or cycloconverter power converter with input power obtained from a fixed or variable frequency single or polyphase alternating current supply. More particularly, this invention relates to a self-controlled polyphase synchronous motor drive system wherein the frequency and phase of the current applied to the stator of a synchronous motor are derived from the frequency and phase of the polyphase stator voltage and the speed and position of the rotor relative to the stator. A phase control means responsive to advanced or delayed analog signals representing the polyphase stator voltage converts the analog voltages to voltage digital timing signals. The voltage digital timing signals are combined with rotor digital timing signals representative of the position of the rotor relative to the stator by a digital gating command signal generating means. The digital gating command signals are applied to control the timing of the converter thyristor gate signals and the current applied to the stator.

This invention also relates to a digital control system for removing distortion from the gate signals applied to the solid state controlled devices for controlling current applied to the stator. In addition, this invention relates to the sensing and control of the converter commutation margin in both the motoring and regenerative braking mode.

2. Description of the Prior Art

Self-controlled synchronous motor drive systems are known which utilize a static switch timing which is responsive to both the phase of machine voltage and the magnitude of the current to maintain reliable commutation under load. In such systems, a discrete transition or step occurs in transferring commutation from a position sensor to a voltage timing control at a particular synchronous motor speed. It is also known in the art to utilize synchronous motor voltage timing control of transistor switches in a brushless drive to effect commutation and self-control of a synchronous motor.

The use of motor power factor control and advancement of the same in response to the synchronous motor speed by use of a variable voltage threshold comparator responsive to the synchronous motor voltage signal which results in a discrete transition from a position sensor to a terminal voltage control circuitry is disclosed in U.S. Pat. No. 3,894,277. A self-controlled synchronous motor drive circuitry employing a voltage source converter wherein the phase of the synchronous motor current is sensed and used to control the phase of the applied voltage is disclosed in U.S. Pat. No. 3,997,825. In U.S. Pat. No. 3,869,099, issued to the inventor herein, the use of a position sensor timing signal and terminal voltage timing signal in a synchronous motor drive system is disclosed.

It is also known in the art to utilize a phase shifter circuit for controlling the power factor of a cycloconverter by generating reference signals for independently controlling the real power and reactive power of a self-controlled cycloconverter as described in U.S. Pat. No. 3,982,168.

In each of the known prior art self-controlled synchronous motor drive systems, the generation of digital timing signals which are responsive to a rotor position analog polyphase signal and an analog stator voltage signal to maintain a three phase current which is applied to a stator winding of a controlled synchronous motor to maintain three phase current commutation under load at all synchronous motor speeds is disclosed or suggested in the prior art.

It is also known in the art to detect distortion in the stator voltage and to replace the same with a selected voltage. The circuit disclosed in Kaeser, et al., U.S. Pat. No. 3,777,250, is typical.

In each of the known prior art self-controlled synchronous motor drive systems, the continuous blending of digital signals advanced or retarded from the stator voltage with digital signals representing rotor position, wherein the digital rotor position signals serve to blank the noise pulses appearing in the digital stator voltage derived signals, is not disclosed or suggested in the prior art. Also not disclosed or suggested in the prior art is the use of a commutation margin sensing and control circuit to assure reliable machine or input line current commutation in motoring or braking.

SUMMARY OF THE INVENTION

In accordance with the present invention, a self-controlled synchronous motor drive system for controlling the phase and frequency of a three phase current applied to a stator winding of a controlled synchronous motor is disclosed. In the present invention, a load phase control circuit, which is responsive to an analog load reference signal and which is representative of the amplitude and frequency of the stator voltage of the controlled synchronous motor and to the digital rotor position reference signal produces digital timing gating command signals which are ultimately applied to threshold detectors which are responsive to summing amplifier means and a pulse width modulated stator control voltage and an unmodulated stator control voltage is disclosed. The gating signals produced by the threshold detectors are utilized to control the current applied to the controlled synchronous motor by solid state power thyristor control switches.

In the preferred embodiment, the self-controlled polyphase synchronous motor drive system is adapted to control a synchronous motor having a rotating field magnet and a polyphase stator wherein the stator has a polyphase voltage applied thereto. The synchronous motor drive system includes a means for producing rotor digital timing signals which are equal in number to two times the number of phases of the polyphase stator and representative of the position of the rotor relative to the stator. A pulse width modulation control signal which is responsive to a motor power factor command signal is produced. A plurality of phase control means equal in number to the number of phases of the polyphase stator receives and is responsive to the pulse width modulation control gating signals. Each of the phase control means has a selected two of the stator voltages applied as an input thereto and includes means for producing a modulated analog reference signal from one of the two selected stator voltages and means for summing the amplitude modulated analog reference signal with an unmodulated analog reference signal produced from the other of the two selected stator voltage. A means for comparing the sum thereof with a threshold voltage signal is provided which produces, as an output therefrom, two digital gating timing signals for each phase of the polyphase stator. Each of the phase control means is responsive to the speed of the synchronous motor such that an absence of digital gating timing signals occurs at zero motor speed. However, as the motor starts, digital timing signals are produced at low speeds, but digital timing signals have distortion induced therein by changes of current acting on the inductance of the synchronous motor. At low motor speeds, the distortion is large compared to the stator voltage. As the speed of the synchronous motor increases, the stator voltage increases in magnitude such that said distortion becomes smaller in magnitude relative to that of the stator voltage until the stator voltage level reaches a magnitude wherein the sum of the amplitude modulated analog reference signal and unmodulated analog reference signal exceeds the threshold level to produce digital timing signals substantially free of distortion.

A digital gating command signal generating means is responsive to the digital gating timing signals from each of the phase control means and to the rotor digital timing signals and produces digital gating command signals. At zero motor speed and low motor speeds, the digital gating command signal generating means is responsive to the rotor digital timing signals to have the leading edge of the digital gating command signals established by the leading edge of a selected one of the rotor digital timing signals. This occurs until the motor speed reaches a speed wherein digital gating timing signals substantially free of distortion are produced by the phase control means. At this speed, the leading edge of the digital gating command signals is determined by one of the leading edges of one of the digital gating timing signals from the phase control means and the leading edge of a selected one of the rotor digital timing signals, whichever occurs first in time. The width of the digital gating command signals is equal to 360 degrees divided by the number of phases of the polyphase stator. The digital gating command signals are applied to thyristors to control the current applied to the stator of the controlled synchronous motor.

The present invention overcomes many of the disadvantages in the prior art self-controlled synchronous motor drive circuits and system. By use of the timing signals developed from the stator voltage reference signal and rotor digital timing signals representative of the rotor position relative to the stator, the transition is made as a function of speed from the rotor position sensor to voltage timing control signals without any discrete transition points occurring at any time during the transition. In addition, the motor power factor is permitted to advance or retard as a function of the timing signals rather than as a function of the synchronous motor speed.

One advantage of the present invention is that a self-controlled synchronous motor drive system is adapted to control operation in response to a rotor position sensor at lower speeds and to make a stepless transition to motor voltage timing control at higher speeds. This method produces close to unity power factor operation at very low speed to provide minimum torque pulsation and controlled leading power factor operation at higher speed for reliable commutation of converter output current, without any discrete changes in power factor angle.

A further advantage of the present invention is that the self-controlled synchronous motor drive circuit provides high power regenerative braking at high speed with synchronous motor voltage allowed to exceed the applied voltage from an AC source.

A yet further advantage of the present invention is that the self-controlled synchronous motor drive circuit is adapted to cooperate with a phase wound rotary transformer having a passive static field supply current which is capable of providing a controlled variation of synchronous motor field current as a function of synchronous motor speed.

A still yet further advantage of the present invention is that the self-controlled synchronous motor circuit is adapted to cooperate with a thyristor gate drive having a clocked rectifier to insure adequate rise time and pulse width for gating the thyristors to apply a controlled current to the stator of the self-controlled synchronous motor.

Yet another advantage of the present invention is the use of a commutation margin detection circuit which monitors digital pulses representing the commutation margin angle and which produces a control pulse to shut down the synchronous motor in the event of insufficient commutation margin angle.

Still yet another advantage of the present invention is the use of a commutation margin sensing and control circuit which advances or retards the stator current relative to the voltage to control the commutation margin angle of the converter in the motoring or braking operating modes.

BRIEF DESCRIPTION OF THE DRAWINGS

These and other objects of the invention, together with its various features and advantages, can be more easily understood from the following more detailed description of the preferred embodiment taken in conjunction with the accompanying drawings:

FIG. 2 is a schematic diagram of a cycloconverter controlled three phase synchronous motor which is energized from a three phase alternating current power source having a predetermined frequency;

FIGS. 11(a) to 11(e) are waveforms of the synchronous motor voltage; the commutation margin pulse waveforms and the commutation margin sensing and trigger angle control signals;

FIGS. 17(a) to 17(e) are waveforms showing the addition of an analog polyphase rotor position reference signal with stator voltage signals derived from the load phase control circuit.

DESCRIPTION OF THE PREFERRED EMBODIMENT

Figure 1:
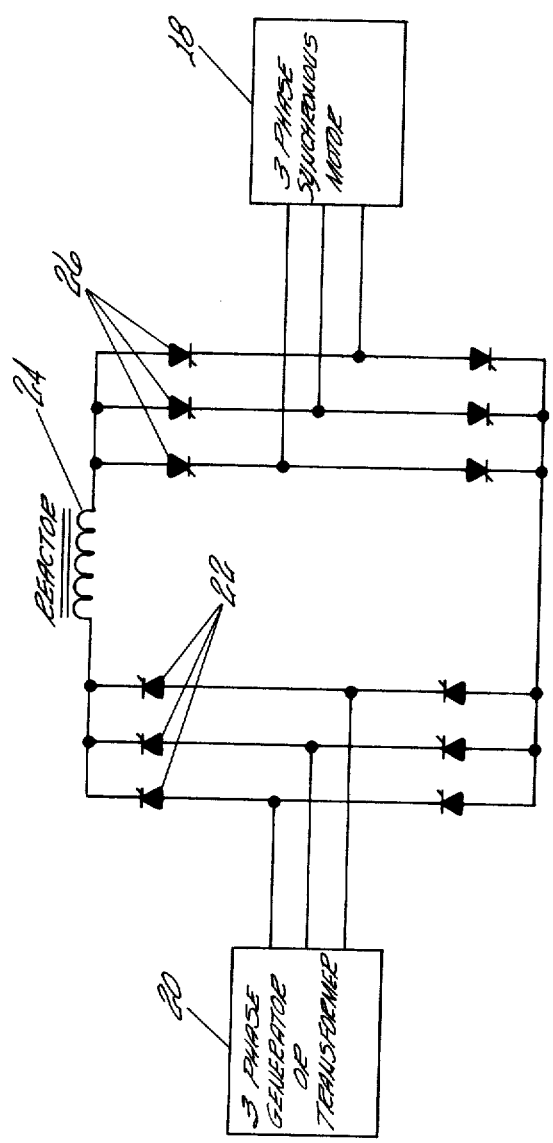
FIG. 1 is a schematic diagram of a rectifier-inverter controlled three phase synchronous motor which is energized from a three phase alternating current source having a predetermined frequency.

FIG. 1 illustrates a self-controlled synchronous motor 18 adapted to be energized from an alternating current power source 20 for controlling the current to the motor 18. In FIG. 1, a rectifier 22, a reactor 24 and an inverter 26 produce a polyphase current which is applied to the stator of motor 18.

FIG. 2 illustrates a self-controlled synchronous motor adapted to be energized from an alternating current power source 30 for controlling the power factor of a three phase synchronous motor 32. In FIG. 2, the three phase synchronous motor 32 is operated by a cycloconverter. The alternating current power source 30 energizes the three phase self-controlled synchronous motor 32 by means of conductors 34 which apply the alternating current power source to a plurality of thyristors 36 through interphase reactor 38. The thyristors 36 are responsive to digital gating command signals, described in detail in reference to FIG. 5, which are utilized to control the current applied to the synchronous motor 32.

Figure 3:
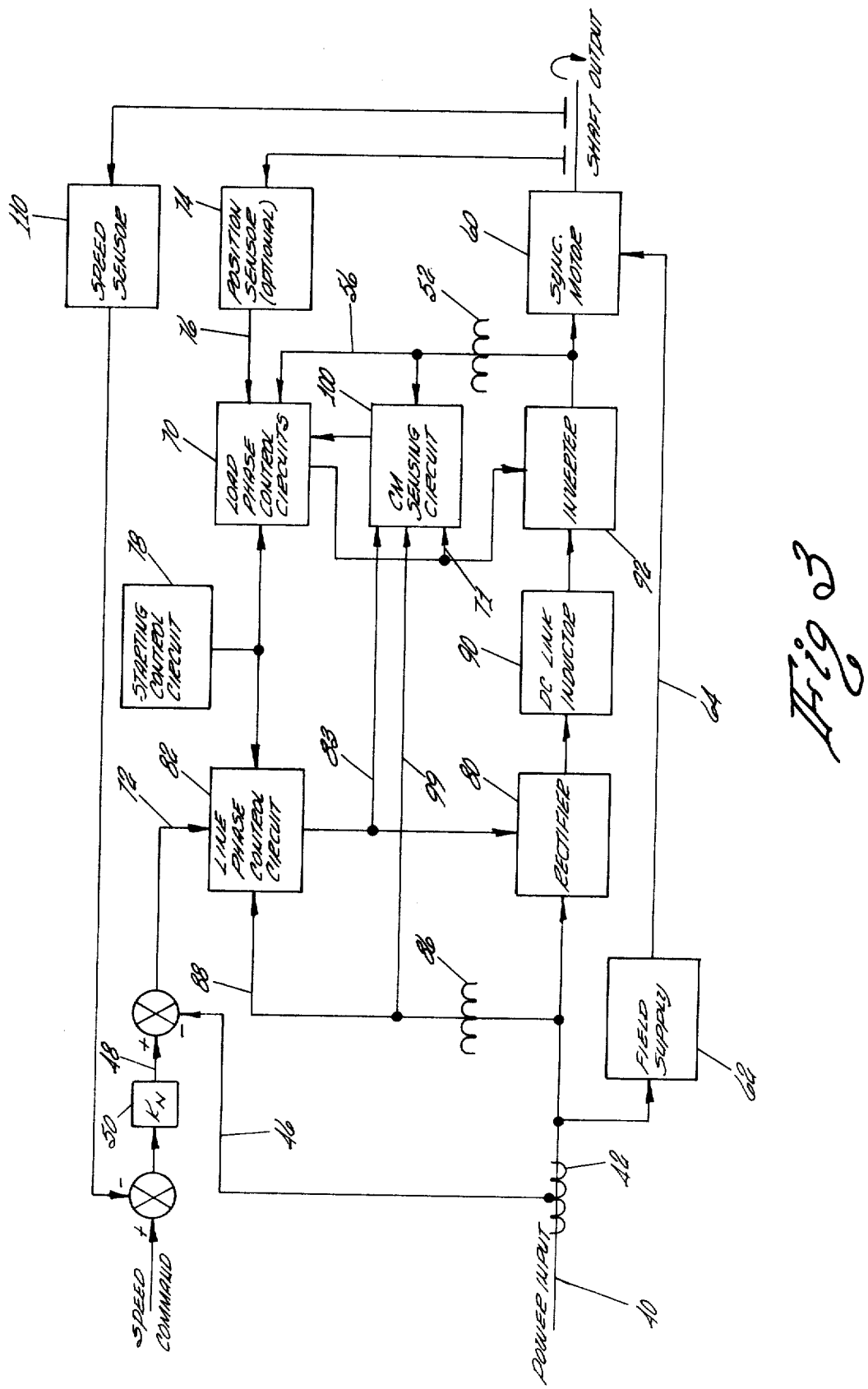
FIG. 3 is a block diagram of a self-controlled synchronous motor operated as in rectifier-inverter operation mode using the teachings of this invention.

FIG. 3 shows a block diagram for a self-controlled synchronous motor drive system and circuit which is adapted to operate a polyphase synchronous motor 60 in a rectifier-inverter mode. The synchronous motor 60 is energized from a three phase alternating current source which is represented by line 40. A current transformer 42 is adapted to detect the alternating current magnitude supplied by the alternating current power source to the motor 60. An analog signal representative of the alternating current is represented by line 46 as a feedback signal for a closed-loop current regulator. The command input 48 to the current regulator loop is the error of the speed regulator loop amplified by the gain, $K_N$, identified as amplifier 50.

A polyphase voltage transformer 52 is adapted to respond to the stator voltage of a controlled synchronous motor 60 for producing analog load reference voltages represented by line 56. The analog load reference voltages 56 are representative of the amplitude and frequency of the stator voltage of the synchronous motor 60. The analog reference voltages are applied as an input variable to load phase control circuits 70.

The synchronous motor 60 has a field supply 62 which may be any one of many known active or passive field supply circuits. In the preferred embodiment, the field supply 62 is passive and includes a phase wound rotary transformer, rotating rectifier, a stationary 60 Hertz field supply transformer and coupling capacitors which provide a controlled variation of synchronous motor field current as a function of speed. The output of the field supply 62 is supplied to the field winding by conductors depicted by line 64.

Load phase control circuits 70 are responsive to the analog load reference voltages 56 developed from the voltage transformer 52 and to a rotor position sensing means 74 which is adapted to produce rotor digital timing signals represented by line 76 which are input to the load phase control circuits 70. The voltage transformer 52 which is adapted to produce the analog load reference signal representative of the amplitude and frequency of the stator voltage applies the analog load reference voltage to the load phase control circuits 70. A starting control circuit 78 is required to start the polyphase synchronous motor 60 in the rectifier-inverter configuration.

The rectifier 80 is controlled by an input line phase control circuit 82 which is responsive to a current error signal which appears on line 72. Also, the line phase control circuit 82 receives a line voltage reference signal from a voltage transformer 86 which is depicted by line 88. The line phase control circuit 82 applies control signals to rectifier 80. The output of rectifier 80 is a DC current which is applied through inductor 90, which, in turn, applies the current to inverter 92. The inverter 92 is responsive to the load phase control circuits 70 to control the phase of the inverter with timing signals which are responsive to the load reference voltage signal on lead 56 and to the polyphase rotor position reference voltage signal developed on lead 76 developed from the rotor position sensor 74. A commutation margin sensor circuit 100 is connected between the output of the voltage transformer 52 and the load phase control circuits 70 shown by arrow 71 which represent load digital gating command signals. In addition, the commutation margin sensor circuit 100 receives an input from line phase control circuit 82 as shown by line 83 which represents line digital gating command signals and from the voltage transformer 86 as shown by line 99 which represents the line-to-line input voltage.

Figure 4:
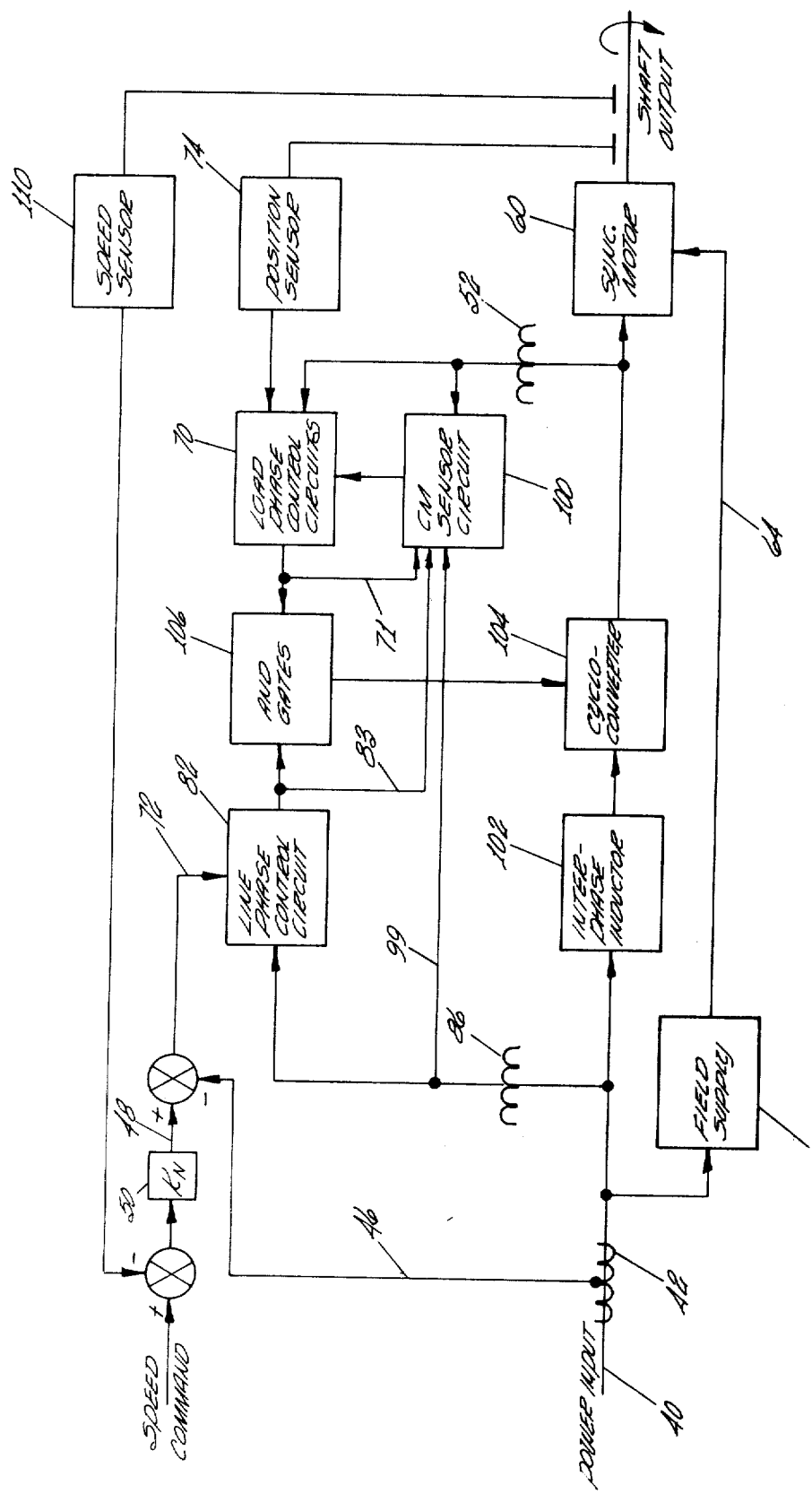
FIG. 4 is a block diagram of a self-controlled synchronous motor operated as a cycloconverter using the teachings of the present invention.

FIG. 4 shows the use of a self-controlled synchronous motor connected for a cycloconverter configuration. Elements which are common with the configuration depicted in FIG. 3 are designated by the same numerals. In the cycloconverter configuration, the alternating current power source 40 applies an input voltage through an interphase inductor 102 which applies current to the cycloconverter circuit 104. A gating circuit 106, which is in the form of a plurality of logical AND gates is interconnected between the line phase controlled circuit 82 and a load phase control circuit 70 to apply gating signals to the cycloconverter 104. The cycloconverter 104 applies appropriate gating timing signals to the three phase synchronous motor 60 to obtain smooth operation of the same at starting and operating speeds. In FIG. 4, the commutation margin (CM) sensor circuit 100 is connected between the output of the voltage transformer 52 and the load phase control circuits 70 shown by arrow 71. As shown in FIG. 4, the commutation margin sensor circuit 100 has inputs from the line phase control circuit 82 and voltage transformer 86 as shown by lines 83 and 99, respectively, which were described in reference to FIG. 3.

At low speeds, the rotor position sensor 74 applies rotor digital timing signals to the load phase control circuits to control the timing and phase angle of the voltage applied to the stator of the polyphase synchronous motor. As the motor speed increases, the control of the timing signal transfers from the rotor position sensor 74 in a stepless smooth transition to the load voltage reference voltages developed from the stator voltage.

In the embodiments of FIGS. 3 and 4, a speed sensor 110 is responsive to the shaft rotation to produce a speed feedback control signal which is used as part of the feedback loop to develop a speed signal which is ultimately applied with the current feedback signal to the line phase control circuits. The speed signal may be used as a motor power factor command signal during operation.

Figure 5:
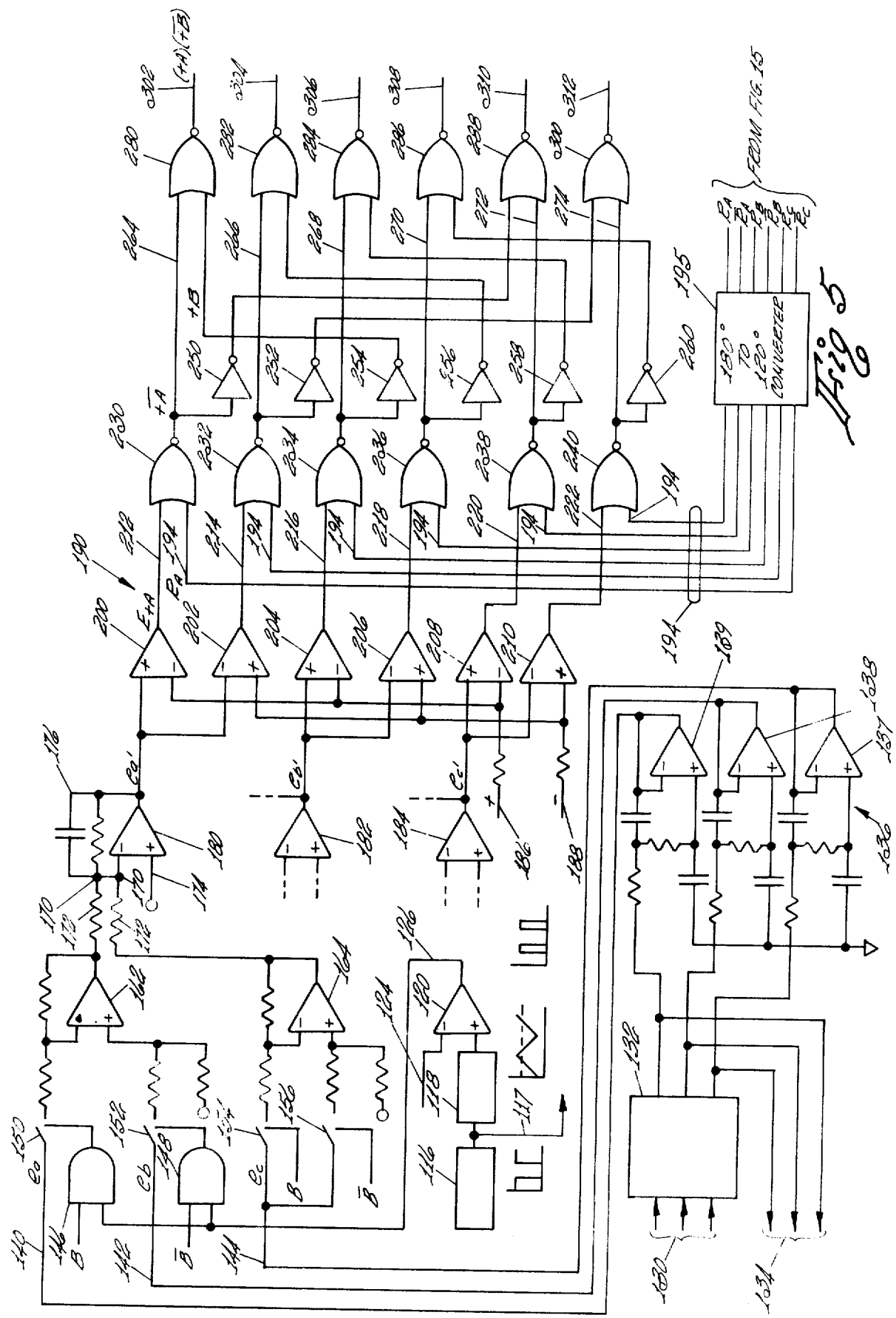
FIG. 5 is a logic diagram showing a phase advance control circuit of the present invention.
Figure 6:
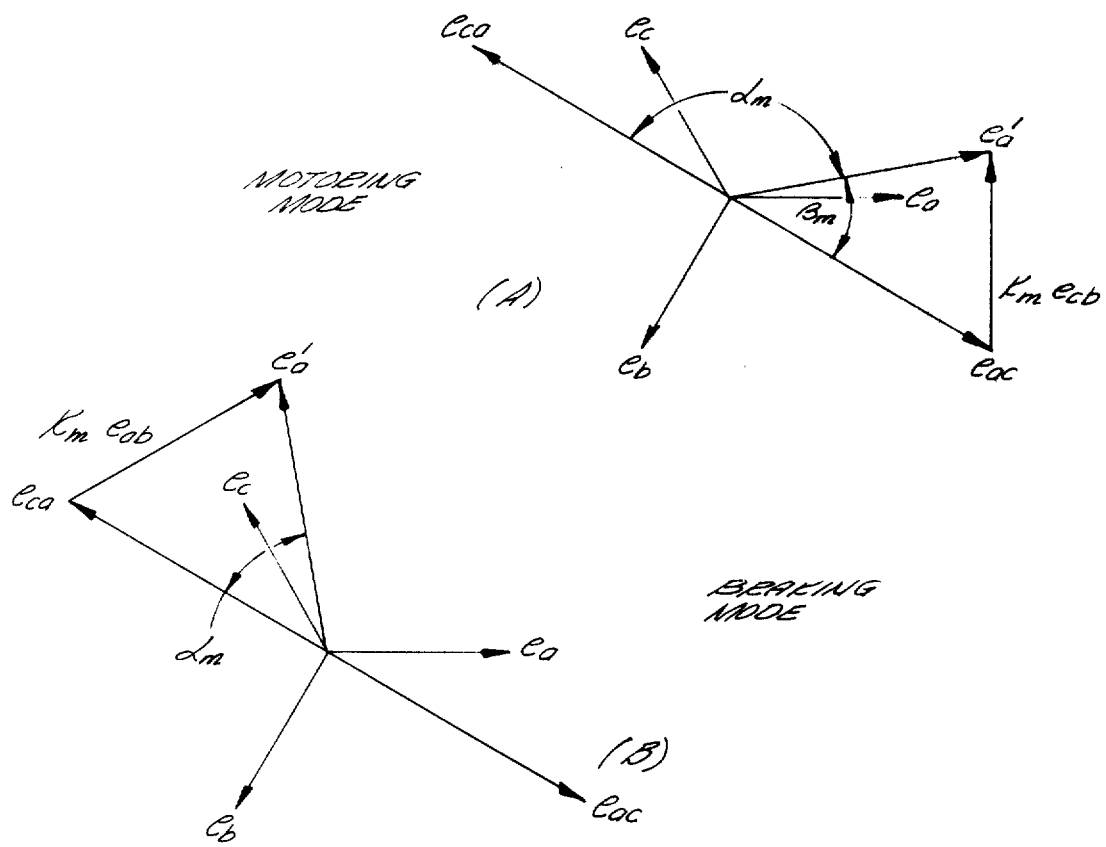

The logic diagram of FIG. 5 shows a means for producing pulse width modulation control signals and a plurality of phase control means. The means for producing pulse width modulation control signals are responsive to the motor power factor command signal which, in the embodiments shown in FIGS. 3 and 4, is a commutation margin signal from a commutation margin sensing and processing circuit illustrated in FIG. 9. In its preferred embodiment, the means for producing pulse width modulation control signals in the self-controlled polyphase synchronous motor drive system of the present invention includes a clock generator 116 having a selected frequency such as, for example, 25 Kilohertz, for producing an output clock signal at a predetermined amplitude, frequency and duration. The output of the clock generator 116 is applied as an input 117 to a rotor position sensing circuit illustrated in FIG. 15 and as an input to a ramp generator 118. Ramp generator 118 is responsive to the output clock signals from clock generator 116 to produce a sawtooth-shaped ramp output signal which varies in amplitude, between minimum and maximum voltage levels.

The output of the ramp generator 118 is applied as one of two inputs to a comparator 120. The other input to comparator 120 is a motor power factor command signal, which in the preferred embodiment, is a commutation margin signal 124 developed by the commutation margin sensing and processing circuit of FIG. 5. Alternatively, the motor power factor command signal may be derived from the speed error signal in a speed control feedback loop. The comparator 120 is responsive to the sawtooth-shaped ramp output signal and to the motor power factor command signal to produce a modulated constant amplitude, pulse width modulation control signal, wherein the pulse width thereof is responsive to the motor power factor command signal which is the input variable as stated hereinabove. The pulse width modulation control signal appears on lead 126.

In the embodiment of the phase control means shown in the logic diagram of FIG. 5, only the diagram for one phase is illustrated in detail. However, in the self-controlled synchronous motor drive system of the present invention, a plurality of phase control means which are equal in number to the number of phases of the polyphase stator are required. In the preferred embodiment of the invention, a three phase current is applied to the stator of the self-controlled synchronous motor 130. The motor produces a three phase stator voltage which is applied to a machine voltage sensor 132. The machine voltage sensor 132 produces analog output voltages, one for each of the polyphase voltages, the magnitude of which is determined by the circuitry of the machine voltage sensor 132 using techniques well known in the art.

The analog output voltages from the machine voltage sensor 132 are used as input voltages to a commutation margin sensing circuit (illustrated in FIG. 9) on leads identified as leads 134 and as an input to a machine voltage filter 136. Filter 136 in the preferred embodiment is a three channel active RC filter and has amplifiers 137, 138 and 139 electrically connected in a circuit configuration to produce an active filter having a Butterworth characteristic. The filtered analog output voltage signals from the filter 136 are applied to leads identified herein as 140, 142 and 144.

Each of the phase control means have a selected two of the three analog output voltages, which represent the stator voltages, applied as an input thereto.

Since only one phase control means is discussed for purposes of example herein, the filtered analog output voltage signals are applied to each of the remaining plurality of phase control means. As noted in connection with the above description, two different selected phases are applied to each of the other phase control means. In the preferred embodiment, a three phase alternating current voltage is used as the input source. Therefore, the preferred embodiment has three phase control means, one for each of the three phases. In FIG. 5, only one phase control means is illustrated, but the logic diagram and operation of the other phase control means is the same as that of the one phase control means illustrated in FIG. 5 and discussed hereinbelow.

The phase control means illustrated in FIG. 5 has programmable switching means which include logical AND gates, such as, for example AND gates 146 and 148, and means for producing a modulated analog reference voltage from the two selected analog voltages applied to the AND gates 146 and 148. Each AND gate 146 and 148 has two inputs, one of which is lead 126 having the pulse width modulation control signal from the comparator 120 thereon and other input of which is logic signal, B, which denotes that the self-controlled motor is in the braking mode (B=1), or the motoring mode (B=0).

The means for producing a modulated analog reference signal, from one of the two selected stator voltages, is one of two switching means identified as switches 150 and 152, which may be field effect transistors or other similar high speed switching devices. The selection of which of the switches 150 and 152 is to be activated depends on whether the motor is in the braking mode or in the motoring mode, as described herein. The second of the two selected analog reference voltages is unmodulated, but is passed either as received or inverted by switches 154 or 156, depending on whether the motor is in the braking mode or motoring mode as stated above.

A summing amplifier 162 receives a modulated output from amplifier 137 through switch 150 if the motor is in the braking mode or from amplifier 138 through switch 152 if the motor is in the motoring mode. The pulse width modulation control signal from comparator 120 on line 126 causes the AND gates 146 or 148 to close switches 150 or 152, respectively, for the duration of the modulation signal, which signal is the format of that described in the preferred embodiment.

Switches 154 and 156 are enabled by a signal representative of whether the motor is in the braking mode or motoring mode. If the motor is in the braking mode, the analog reference voltage signal on input 144 is passed as an unmodulated analog reference signal. If the motor is in the motoring mode, the unmodulated analog voltage reference signal is applied to an inverting amplifier 164. This inverted unmodulated analog reference signal then becomes the unmodulated analog reference signal.

The modulated analog reference signal from either AND gates 146 or 148 is applied to an amplifier 180 through a summing resistor 172 with the input to the amplifier 180 shown by summing point 170. The unmodulated analog reference signal from switch 154 or amplifier 164 is applied to the amplifier 180 through a second, equal value, summing resistor 172. Similarly, the input to the amplifier 180 is shown by summing point 170. The amplifier 180 has a second input 174 which has a selected constant bias voltage signal applied thereto. Resistor 172 and a smoothing filter 176 establish the gain and frequency response of the amplifier 180. The smoothing filter 176 is electrically connected from the output of amplifier 180 to the summing point 170 and functions to remove spurious noise developed by the modulation of the voltages during the pulse width modulation process. The sum of the modulated analog reference signal and unmodulated analog signal is amplified by amplifier 180 to produce as an output therefrom an advanced or delayed voltage reference signal which is applied as an input to two comparators 200 and 202 at the inputs having the polarity as shown thereon. The other input to the comparator 200 is a threshold voltage of a positive polarity as shown on input 186, and the input to the comparator 202 is a threshold voltage of a negative polarity as shown on input 188.

The other two phase control means have similar logic, amplifiers 182 and 184, and associated components, as illustrated in FIG. 5 and likewise produce as an output therefrom an advanced or delayed voltage reference signal. A smoothing filter is likewise connected from the output to the summing point of amplifiers 182 and 184. The output from amplifier 182 is applied as an input to comparators 204 and 206, and the output from amplifier 184 is applied as an input to comparators 208 and 210. Comparators 204 and 208 have a threshold voltage of a positive polarity applied thereto, and comparators 206 and 210 have a threshold voltage of a negative polarity applied thereto.

Comparators 200, 204 and 208 compare the phase shifted stator reference voltages from amplifiers 180, 182 and 184 respectively with a positive threshold voltage on lead 186 which is applied to each comparator. The output of each comparator 200, 204 and 208 is high when the applicable stator reference voltage is greater than the positive threshold voltage. Comparators 202, 206 and 210 compare the stator reference voltages from amplifiers 180, 182 and 184 with a negative threshold voltage, equal in magnitude to the positive threshold voltage, on lead 188. The output of comparator 202, 204 and 206 is positive when the applicable stator reference voltage is less than the negative threshold voltage. During operation, the six comparators 200, 202, 204, 206, 208 and 210 produce digital gating timing signals, two for each phase of the polyphase stator.

When the synchronous motor is conducting current and producing torque in the locked rotor condition, the sinusoidal component of the stator reference voltage is zero and only noise components arising from locked rotator stator current undulations are present. The threshold voltages on lines 186 and 188 which are applied to the comparator, as described above, are preset to a level greater than the magnitude of the noise component which appears in the outputs of the amplifiers 180, 182 and 184, so that the comparator outputs therefrom are zero in the locked rotor condition.

At low motor speeds, the noise component in the output of amplifiers 180, 182 and 184 is superimposed on a sinusoidal signal voltage component at the motor frequency. Each of the six comparators produces a digital gating timing signal when the sum of the magnitudes of the input voltage signal and noise component exceeds the threshold level. As described below, the spurious timing signals induced by the stator voltage noise component are blanked with digital signals derived from the rotor position sensor at low motor speeds.

At high motor speeds, the sinusoidal component of the phase shifted stator reference voltage becomes much greater than the noise component, and the sinusoidal component also becomes much greater in magnitude than the comparator threshold voltage. When this condition occurs, the comparator output is essentially unaffected by stator voltage noise and the comparator output transitions occur near the zero crossings of the phase shifted stator reference signal with negligible phase delay.

The outputs from each of the comparators are applied to a digital gating command generating means 190 which include a plurality of NOR gates 230, 232, 234, 236, 238 and 240. A second set of inputs are applied to the NOR gates 230, 232, 234, 236, 238 and 240 which comprise rotor digital timing signals shown as input 194. The rotor digital timing signals 194 have a duration of 120° each and are derived from rotor digital signals produced by a rotor position detecting circuit such as that illustrated in FIG. 15 which are 180° duration and which are converted to 120° duration by a 180° to 120° converter 195 using circuits which are well known in the art. The number of rotor digital timing signals is equal in number to two times the number of phases of the polyphase stator and is representative of the position of the rotor relative to the stator. Thus, the digital gating command signal generating means 190 is responsive to the digital gating timing signals from each of the phase control means and produced as an output signal from comparators 200, 202, 204, 206, 208 and 210 and to the rotor digital timing signals 194 for producing digital gating command signals as an output therefrom. When the synchronous motor is at zero speed or at low speeds, the digital gating command signal generating means 190 is responsive to the rotor digital timing signal 194. At zero motor speed and low motor speeds, the leading edge of the digital gating command signals produced is established by the leading edge of a selected one of the rotor digital timing signals appearing on leads 194 until the motor speed reaches a speed where digital gating timing signals substantially free of distortion are produced by the phase control means through comparators 200, 202, 204, 206, 208 and 210. When the synchronous motor speed reaches a speed where the digital gating timing signals are substantially free of distortion, the leading edge of the digital gating command signal is determined by one of the leading edges of the digital gating timing signals from the phase control means which is applied to NOR gates 230, 232, 234, 236, 238 and 240, and the leading edge of a selected one of the rotor digital timing signals appearing on leads 194, whichever occurs first in time.

The width of the digital gating command signals is determined by the phase displacement of successive phases which is equal to 360 degrees divided by the number of phases of the polyphase stator.

In the embodiment of FIG. 5, the output from the NOR gates 230, 232, 234, 236, 238 and 240 is applied via leads 264, 266, 268, 270, 272, and 274, respectively, to a second set of NOR gates 280, 282, 284, 286, 288 and 300, respectively. Also, the output from the NOR gates 230, 232, 234, 236, 238 and 240 is applied to inverters 250, 252, 254, 256, 258 and 260, respectively, which produces an inverted signal such that the leading edge thereof can be applied to a different NOR gate. For example, the output from NOR gate 230 is inverted by inverter 250, and the inverted signal is, in turn, applied as an input to NOR gate 288. By interconnecting the inverted signals as illustrated in FIG. 5, the inverted leading edge is used to produce resultant digital gating command signals having 120° pulse width.

The digital gating command signal produced by the digital gating command signal generating means 190 appears on output leads 302, 304, 306, 308, 310 and 312, and is in the form of digital signals equal in number to two times the number of phases of voltage applied to the stator voltage. The digital gating command signals are then applied to pulse amplifying circuitry and subsequently to solid state power control devices, which are known in the art, to control the current applied to the stator of the controlled synchronous motor.

Figure 6:
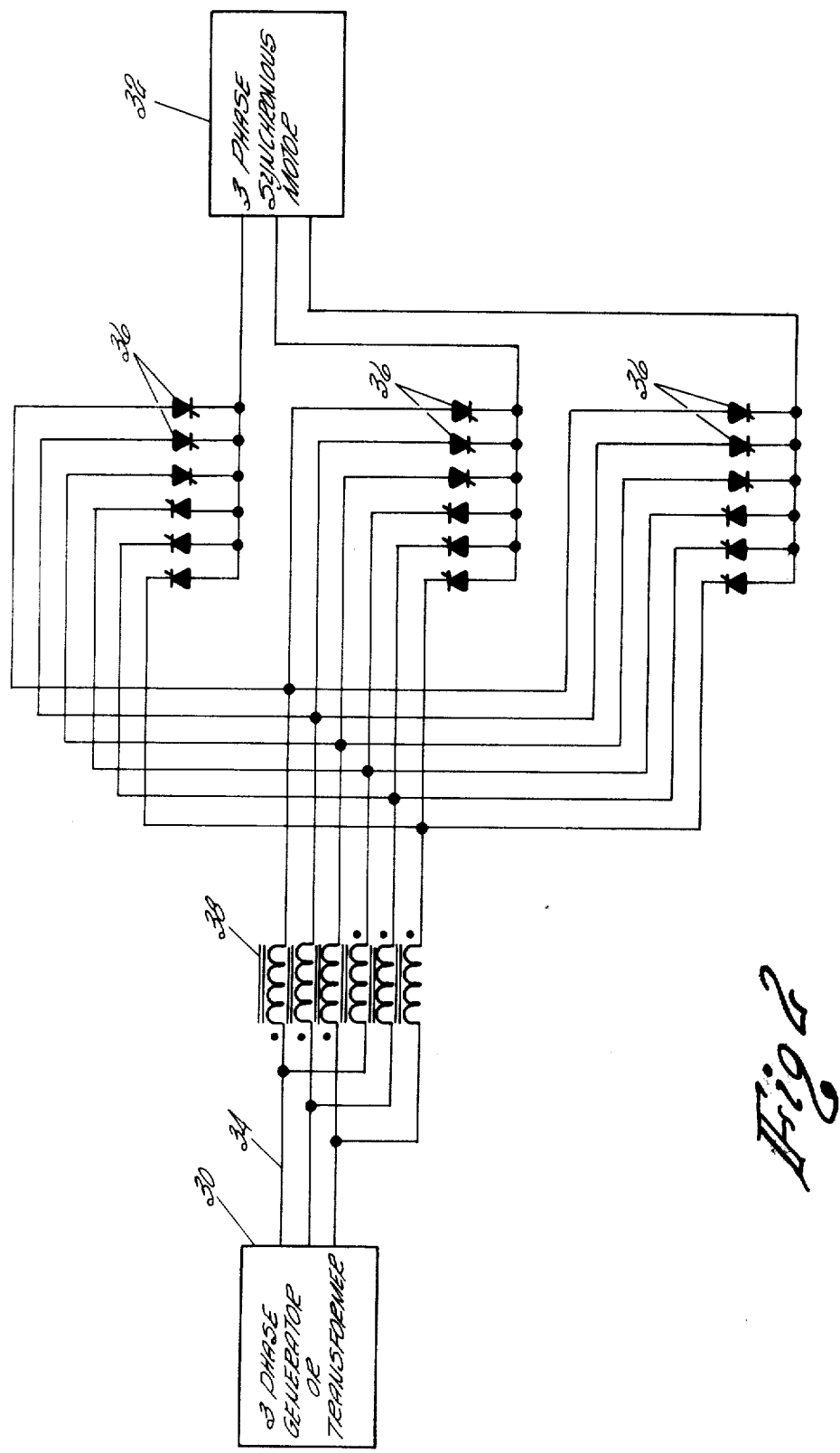
FIG. 6 is a diagram showing a self-controlled synchronous motor signal voltage phasor addition during motoring and braking phase.

FIGS. 6(a) and 6(b) illustrate the machine signal voltage addition performed by the circuitry of the phase control means discussed in connection with FIG. 5. FIG. 6(a) illustrates the voltage phasor addition when the motor is in the motoring mode. In the phasor diagram shown in FIG. 6, the term $\beta_m$ is representative of the trigger angle of a current applied to the polyphase stator of a synchronous motor. The term $\beta_m$ represents the phase angle between the resultant voltage phasor $e_a{}'$ and the line-to-line voltage signal, $e_{ac}$. The voltage phasor $e_a{}'$ is the resultant of the line-to-line voltage phasor, $e_{ac}$, and the modulated line-to-line voltage, $K_m e_{cb}$. The term $K_m$ is the pulse width modulation factor produced by the circuitry of FIG. 5.

In the braking mode, the resultant voltage phasor, $e_a{}'$, is formed from the inverted line-to-line voltage phasor, $e_{ca}$, and the modulated line-to-line voltage phasor, $K_m e_{ab}$.

Thus, depending on whether the self-controlled synchronous motor is in the motoring mode as shwon in FIG. 6(a) or in the braking mode as shown in FIG. 6(b), the magnitude and phase of the resultant voltage is determined by the control variable $K_m$. $K_m$ is, in turn, controlled by the commutation margin control signal in this embodiment.

Figure 7:
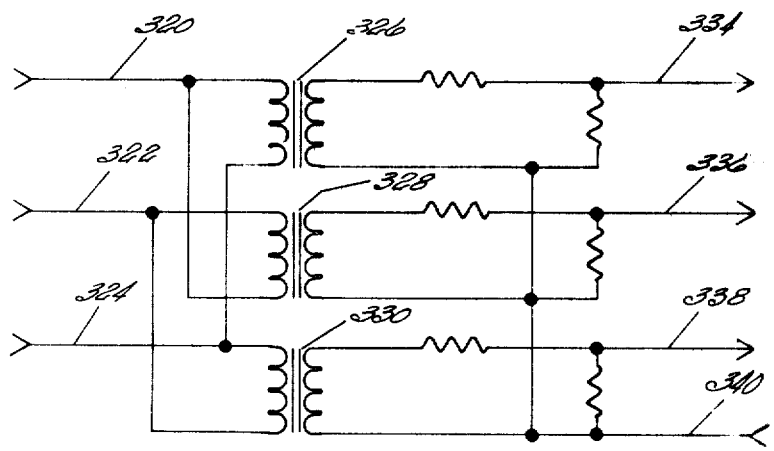
FIG. 7 is a schematic diagram showing a transformer connection of stator voltage responsive means.

FIG. 7 illustrates the wiring diagram for the transformer connections which serve as the machine voltage sensor 132 of FIG. 5. The motor stator voltage is applied to the transformer primary by input leads 320, 322 and 324. The voltage sensor includes three sets of windings 326, 328 and 330 on a three phase core, one for each phase of the stator voltage. The three primary windings of the transformer are electrically connected in a delta configuration while the secondary windings are connected in a wye configuration. Step-down voltages which are representative of the stator polyphase line-to-line voltages appear between the common lead 340 and each of the phase leads 334, 336 and 338.

Figure 8:
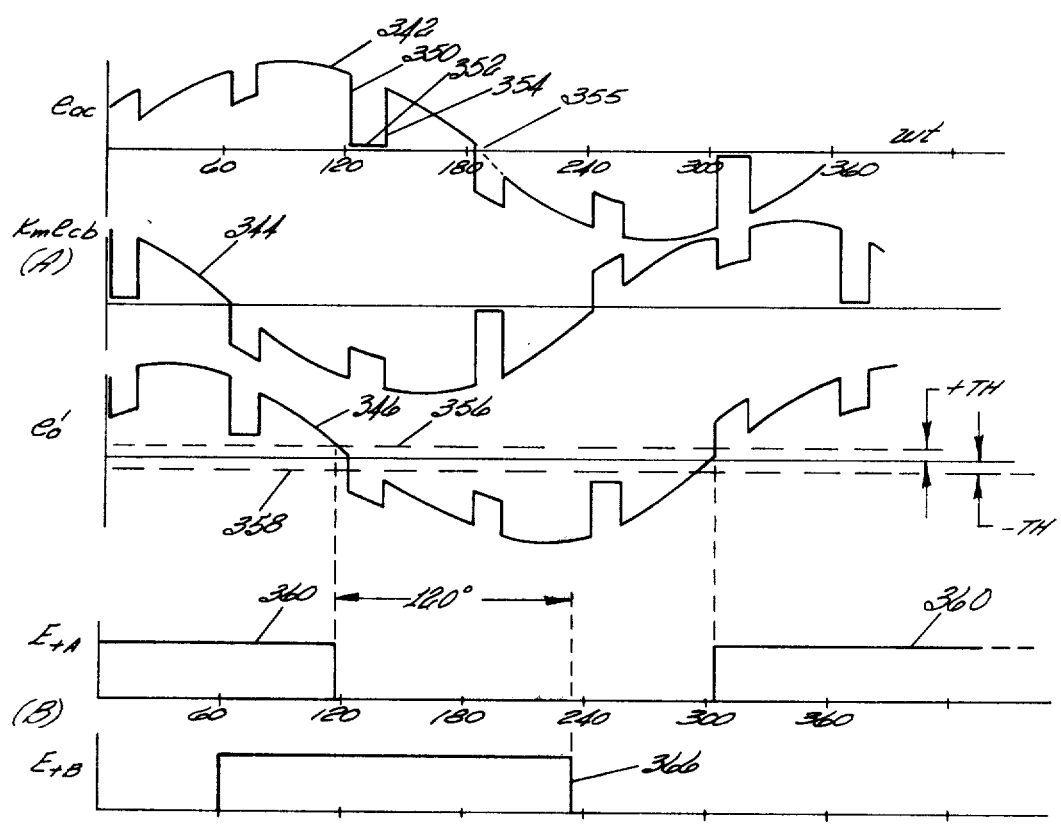
FIGS. 8(a) and 8(b) show voltage waveforms developed from a stator voltage sensor for producing an analog reference signal, an analog modulated line-to-line voltage and the sum of the two analog signals, and signals of two threshold comparator outputs.

FIG. 8 illustrates the various waveforms of the phase control means and the digital gating command signal generating means 190.

In FIG. 8(a), the first voltage waveform, $e_{ac}$, is illustrated for a single cycle. The positive transition of the waveform is shown as 342, and the waveform has a notch therein defined by edge 350, bottom 352 and edge 354, and a zero crossing defined by 355. The width of the notch is equal to the angle $\mu_m$ required for current to transfer (commutate) from one motor phase to another. This is also the commutation angle of the current in the solid state controlled devices in the motor controller. The trigger angle, $\beta_m$, is the angle between edge 350 and the intersection of the extension of waveform 342 with the horizontal axis, designated as point 355. The second waveform 344 of FIG. 8(a) is a waveform of $K_m e_{cb}$ which is the modulated line-to-line voltage shown in FIG. 6(a). The third waveform 346 is $e_a{}'$ and has imposed thereon dashed line 356 which represents the magnitude of the positive threshold voltage which is applied to lead 186 of FIG. 5, which threshold voltage is applied to comparators 200, 204 and 208 of FIG. 5. The output of comparators 200, 204 and 208 is designated as $E_{+A}$, $E_{+B}$, and $E_{+C}$, respectively. Likewise, the dashed line 358 represents the negative threshold voltage which appears on lead 188 in FIG. 5 and which is subsequently applied to comparators 202, 206 and 210.

In FIG. 8(b), the waveforms 360 and 366 are the typical outputs from threshold comparators. In FIG. 8(b), the first waveform illustrated is for the voltage $E_{+A}$, and the second waveform is for the voltage $E_{+B}$, which is displaced from $E_{+A}$ by the 120 electrical degrees. NOR gate 230 in FIG. 5 receives $E_{+A}$ on input 212 and a rotor digital timing signal, designated as $R_A$ from FIG. 15, on input 194 to produce the logical term $\overline{+A}$. Similarly, NOR gate 234 produces the signal $+B$ which is inverted by inverter 254 to $+B$ which is applied to the input of NOR gate 280 with the signal $\overline{+A}$ from NOR gate 230 to produce the logical output of $(+A) \overline{(+B)}$.

At zero motor speed or low motor speed, the six digital rotor position signals are used as the six digital gating timing signals which is illustrated in FIG. 17 and discussed in detail hereinbelow.

Figure 9:
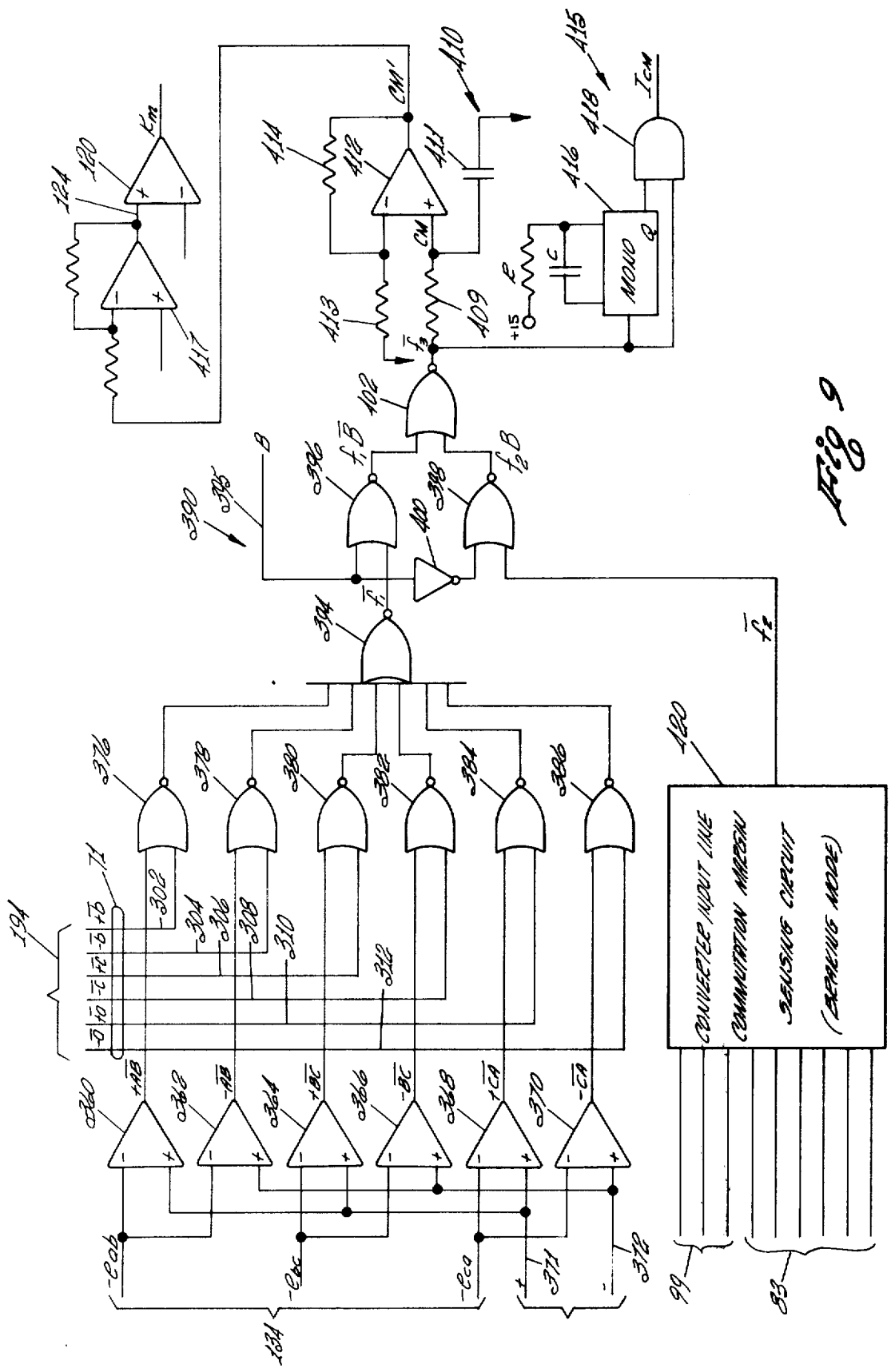
FIG. 9 is a logic diagram showing a commutation margin sensing circuit.

FIG. 9 illustrates the preferred embodiment of a converter output load commutation margin sensing circuit. The sensing circuit illustrated by the logic of FIG. 9 is for the motor in the motoring mode. A similar logic diagram and circuitry is used when the motor is in a braking mode, and this is illustrated by rectangle 420 labelled "Converter Input Line Commutation Margin Sensing Circuit" (Braking Mode).

The inputs of the commutation margin sensing circuit are the analog voltage signals 134 which are produced by the machine voltage sensor 132 as illustrated in FIG. 5. The commutation margin sensing circuit operates to produce an analog signal which is represented by the difference between $\beta_m$, the trigger angle of the current applied to the polyphase stator of a synchronous motor and the commutation angle, $\mu_m$, of the solid state control devices which control the current to the polyphase stator. The commutation margin sensing circuit includes a plurality of threshold comparators equal in number to twice the number of phases of the polyphase stator. In the embodiment of FIG. 9, there are six comparators, namely, comparators 360, 362, 364, 366, 368 and 370. The comparators are arranged in pairs, and each comparator pair is adapted to receive as an input thereto an analog reference signal representative of a voltage between two selected phases of the polyphase stator.

In the embodiment of FIG. 9, the comparator pairs are as follows:

Set 1—Comparators 360 and 362;
Set 2—Comparators 364 and 366; and
Set 3—Comparators 368 and 370.

Each of the pairs of comparators are responsive to a first threshold signal which is applied as one input of each comparator pair and a second predetermined threshold voltage level applied as an input to the other comparator of each comparator pair. In FIG. 9, the threshold voltages appear on leads 371 and 372.

Each comparator of the comparator pairs is responsive to both an analog reference signal representative of the voltage between two selected phases and to a threshold voltage to produce output pulses. In operation, one comparator of each comparator pair, such as, for example, comparator 360, has as inputs thereto and is responsive to the line voltage $-e_{ab}$ and to a first threshold voltage which appears on lead 371. This line voltage $-e_{ab}$ is shown as waveform $e_{ab}$ ($-e_{ab}$ inverted) in FIG. 10(a), and the level of the first threshold voltage is shown by dashed line 430 in FIG. 10(a). Each time the magnitude of the analog voltage reference signal $e_{ab}$ exceeds the level of the first threshold voltage shown as 430, comparator 360 produces an output pulse. A typical output pulse is shown as pulse 470 in FIG. 10(b).

The output pulse produced by comparator 360 for each successive comparator pulse has the leading edge and trailing edge thereof established each time the amplitude of the stator voltage successively exceeds and then falls below the first threshold voltage level.

Referring to waveform $e_{ab}$ of FIG. 10(a), a "notch" appears in the waveform which represents the commutation angle, $\mu_m$. One side of the "notch" is defined by edge 422 wherein the voltage $e_{ab}$ drops below the first threshold level 430, and the other side of the "notch" is defined by edge 424 where the voltage exceeds the first threshold level 430. Toward the end of the positive going portion of $e_{ab}$, the voltage at point 426 again falls below the first threshold level 430.

The leading edge of pulse 470 in FIG. 10(b) is defined by $e_{ab}$ first exceeding the threshold level 430. Edge 422 of $e_{ab}$ defines the trailing edge of 470. The edge 424 defines the leading edge of the next successive pulse 472, and the trailing edge of pulse 472 is defined by point 426. The spacing between the trailing edge of pulse 470 and the leading edge of pulse 472 is equal to the commutation margin angle, $\beta_m-\mu_m$.

Referring again to FIG. 9, the pulses shown in FIG. 10(b) appear on the output of comparator 360. In a similar manner, comparator 362, which is the other of the comparator pair, likewise produces a series of output pulses. Also, each comparator of comparators 364 and 366 of the second comparator pair and comparators 368 and 370 of the third comparator pair operates in a similar manner to produce output pulses. The output pulses are applied to a plurality of digital gating means equal in number to and operatively coupled to the comparators.

In the preferred embodiment, the output pulses from comparators, 360, 362, 364, 366, 368 and 370 are applied as one of two inputs to a NOR gate 376, 378, 380, 382, 384 and 386, respectively. The other inputs to NOR gate 376, 378, 380, 382, 384 and 386 are six load digital gating command signals 71 produced by the digital gating command signal generating means illustrated in FIG. 5 and labeled leads 302, 304, 306, 308, 310 and 312 respectively.

Referring to NOR gate 376, the inputs thereto are the output from comparator 360 and the load digital gating command signal 302 which is labeled "+b". The digital gating command signal +b is illustrated in FIG. 10(c) as waveform 474.

In FIGS. 10(b) and 10(c), the trailing edge of pulse 470 occurs at the same time as that of the leading edge of pulse 474. Thus, NOR gate 376 is responsive to the pulse 472 to produce a single output pulse illustrated in FIG. 10(d) which is labedled 472 and which is referred to herein as a digital commutation margin pulse.

In a similar manner, the other comparator 362 produces a series of output pulses shown in FIG. 10(e) as pulses 478 and 480. The digital gating command signal appearing on lead 304 in FIG. 9 is illustrated by pulse 484 in FIG. 10(f). The output pulses 478 and 480 and the digital gating command pulse 484, when applied to NOR gate 378 result in the NOR gate 378 producing a digital commutation margin pulse illustrated as pulse 486 in FIG. 10(g).

The remaining NOR gates 380, 382, 384 and 386 are rendered operative in a similar manner by equivalent pulses, and each produces a digital commutation margin pulse. The so-produced digital commutation margin pulses are illustrated as pulse 488 in FIG. 10(h) for NOR gate 380, as pulse 490 in FIG. 10(i) for NOR gate 382, as pulse 492 in FIG. 10(j) for NOR gate 384, and as pulse 494 in FIG. 10(k) for NOR gate 386.

The outputs from each NOR gate 376, 378, 380, 382, 384 and 386 are applied as an input to a digital logic element, which, in the preferred embodiment, is NOR gate 394. NOR gate 394 is responsive to each of the digital commutation margin pulses to produce a series of digital variable width output pulses illustrated as pulses 500 in FIG. 10(l). The number of digital variable width output pulses is equal in number to the number of comparators. As noted herein, each of the digital commutation margin pulses has a uniform predetermined amplitude and a width representative of the commutation margin which is the difference in phase angle between the trigger angle $\beta_m$ and commutation angle $\mu_m$ of each phase.

The above-described commutation margin sensing circuit is adapted for use by the control system when the synchronous motor is in the motoring mode. The output of the NOR gate 394 is designated as $\overline{f}_1$, and is rendered operative during the motoring mode. A similar and identical circuit identified as 420 and entitled "Converter Input Line Commutation Margin Sensing Circuit" is utilized when the motor is in the braking mode. The inputs to the converter input line commutation margin sensing circuit 420 are input line reference voltages 99 and line digital gating command signals 83. The output of the input line commutation margin sensing circuit 420 is designated as $f_2$.

In the embodiment illustrated in FIG. 9, the digital pulse selecting means 390 is adapted to receive digital commutation margin pulses from the load commutation margin sensing circuit which has its output at NOR gate 394 and from the converter input line commutation margin sensing circuit 420. The digital pulse gating means 390 in the embodiment of FIG. 9 includes three NOR gates identified as 396, 398 and 402. Each NOR gate 396 and 398 has two inputs thereto. The NOR gate 396 is responsive to the load digital commutation margin pulses produced by NOR gate 394 which are applied as one input to NOR gate 396. The other input to NOR gate 396 is a signal which appears on lead 395 which indicates that the motor is in the braking mode or motoring mode. For purposes of this description, if the motor is in the motoring mode, a "0" appears on lead 395. The signal appearing on lead 395 is applied through an inverter 400 as an input to the NOR gate 398. The other input to NOR gate 398 is the output from the line commutation margin sensing circuit 420 of the motor. Thus, depending on whether the motor is in the motoring mode or braking mode, either NOR gate 396 or NOR gate 398 is conditioned to pass the digital commutation margin pulses to NOR gate 402. In operation, when the motor is in the motoring mode, a "0" appears on lead 395. Inverter 400 inverts the signal to produce and apply a "1" to NOR gate 398.

Thus, the output of NOR gate 398 is a "0", and the output of NOR gate 396 then becomes the inverted load digital commutation margin pulse which is designated as $f_1\overline{B}$, which is equal to $f_1$ since B=0.

When the motor is in the braking mode, the "1" appears on lead 395 which results in NOR gate 396 producing a zero therefrom. The digital commutation margin pulse designated as lower $\overline{f_2}$ is then applied to and passed by NOR gate 398 and applied as an input to NOR gate 402. Thus, at the output of NOR gate 402 is an inverted digital commutation margin pulse designated as $\overline{f_3}$.

The output of NOR gate 402 is the selected inverted digital signal having a pulse width representative of input line or output load commutation margin and is the output defined as $\overline{f_3}$.

The output of NOR gate 402 is applied to filtering means 410 which is an RC circuit formed of a resistor 409 and a capacitor 411 which has a long time constant relative to the width of pulses from NOR gate 402. The output of the RC filter 410 is designated as CM and is applied as an input, labelled CM on FIG. 9, to a nonlinear amplifying means, such as a nonlinear amplifier 412.

Figure 10:
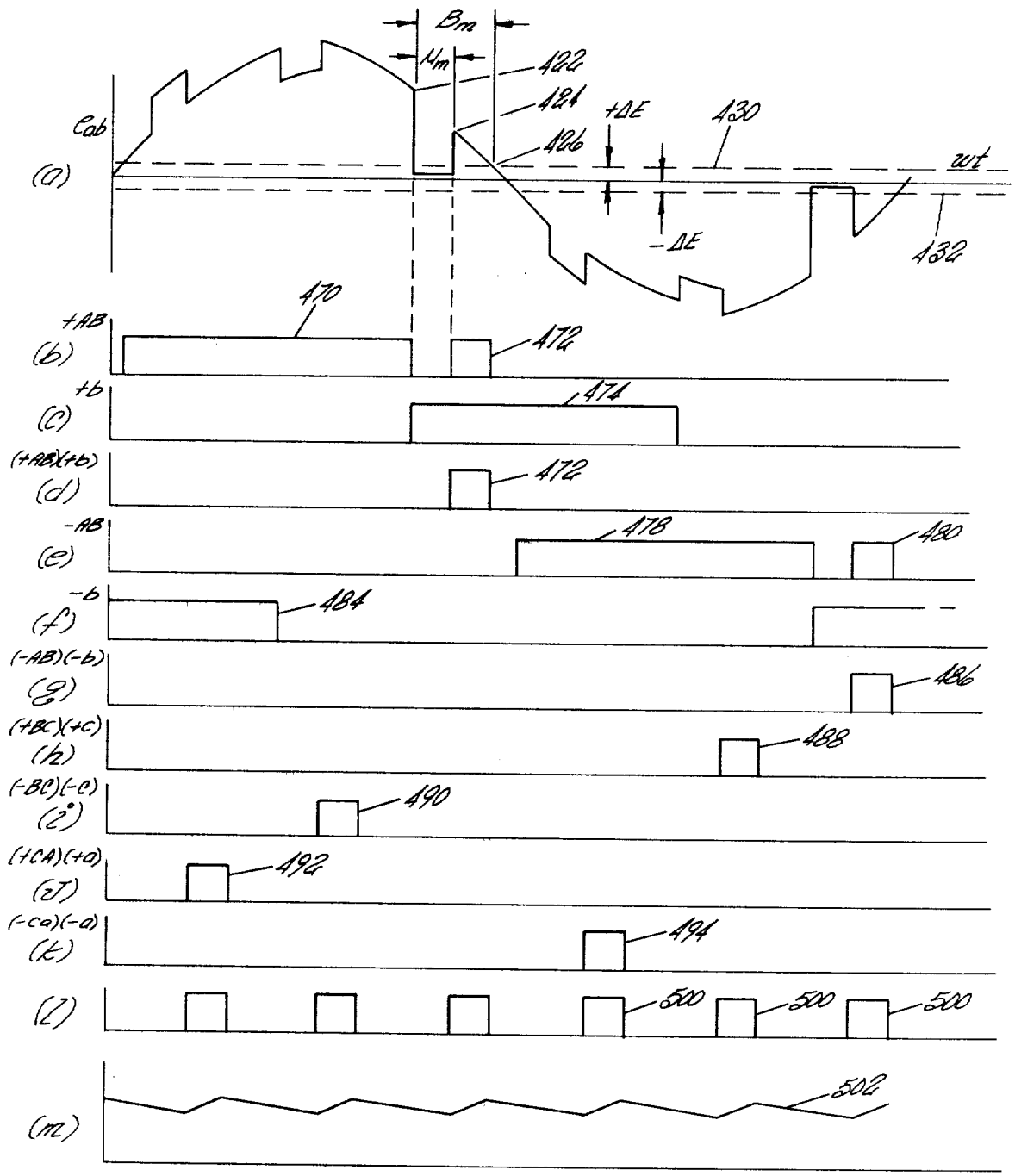
FIG. 10 are analog waveforms of the various stator voltage and digital waveforms at designated points in the logic circuitry showing the commutation margin detection circuit operation.

The RC circuit filtering means 410 is responsive to the series of digital variable width output pulses received from the NOR gate 402 which are illustrated as pulses 500 in FIG. 10(*l*). The RC circuit filtering means 412 averages the digital variable width output pulses to produce an analog output signal. The analog output signal is representative of the line or load commutation margin angle. The analog output signal CM is illustrated by waveform 502 in FIG. 10(*m*). The output of nonlinear amplifier 412 is designated as CM' and is applied as an input to a fixed gain, linear, inverting amplifier 417 which produces as an output therefrom a motor power factor command signal which appears on lead 124, which signal is an input to pulse width modulator comparator 120 illustrated in FIG. 5.

The nonlinear amplifier means 412 is operatively coupled to the RC circuit filtering means 410 for receiving the commutation margin analog output signal as an input thereto and amplifying the same such that when the magnitude of the commutation margin analog output signal is between a maximum level and a lower predetermined level, the nonlinear amplifying means 412 output signal is a constant high level output signal. When the magnitude of the commutation margin analog output signal is between zero and the predetermined level, the magnitude of the nonlinear amplifier 412 output signal is proportional to the magnitude of the commutation margin analog output signal which is the input signal thereto.

The transient response of the commutation margin sensing circuit to a condition of decreased commutation margin is illustrated in FIG. 11. The waveform of FIG. 11(*a*) shows the stator voltage $e_{ab}$, the first threshold voltage level as shown by dashed line 430 and a second threshold voltage shown by dashed line 432. The identification of the edges of the notch are the same numerals as illustrated in FIG. 10. The output of NOR gate 396 is illustrated in FIG. 11(*b*) as $f_1$. The pulse train is illustrated by pulses 440. In the embodiment illustrated in FIG. 11(*b*), the commutation margin angle, $\beta_m - \mu_m$, is shown to be decreasing in magnitude. Thus, the widths of the pulse train commence as shown by pulse 440, but as $\beta_m - \mu_m$ decreases, the pulse widths of $f_1$ become narrower as shown by pulses 442 and 444 in FIG. 11(*b*).

The digital margin commutation pulses represented by $f_1$ are applied to the RC circuit filtering means where they are averaged. Waveform 448 in FIG. 11(*c*) shows that the average voltage exceeds a voltage reference $V_R$ which represents the predetermined level of a voltage shown by dashed line 450. Thus, when input to the nonlinear amplifier 412 exceeds the voltage represented by dashed line 450, the average voltage is in excess of the predetermined level 450. However, when the variable width digital commutation pulses become narrower in width, the average voltage begins to decrease. When the variable width digital output pulses become extremely narrow representing a small commutation margin angle, the average voltage applied as input CM from the RC circuit filtering means drops below the predetermined level represented by dashed line 450. In FIG. 11(*c*), that portion of the commutation margin analog output signal which drops below and which is less than the reference voltage $V_R$ represented by dashed line 450, is illustrated by segment 452.

As noted hereinbefore, the nonlinear amplifier 412 is responsive to produce a constant high level output signal when the commutation margin analog output signal represented by waveform 448 in FIG. 11(*c*) exceeds the reference voltage $V_R$, represented by dashed line 450. The output of the nonlinear amplifier 412 which remains at a constant level is depicted by output 456 on waveform 11(*d*). However, when commutation margin analog output signal drops below the predetermined level represented by dashed line 450, the output of the nonlinear amplifying means 412 is proportional to the magnitude of the commutation margin analog output signal applied as CM to the nonlinear amplifier means for 412, producing the output signal CM'. When the magnitude of the commutation margin analog output signal is less than the reference voltage $V_R$ illustrated by dashed line 450 on FIG. 11(*c*), the output of the nonlinear amplifier 412 is illustrated by waveform 458. The output of the nonlinear amplifier means 412 approaches a minimum level as illustrated by the segment of the waveform designated as 458.

The output CM' is applied to and inverted by the linear, fixed gain amplifier 417 as shown in FIG. 9, and the input from amplifier 417 is used as the motor power factor command signal 124 which is one of two inputs to a comparator 120 which controls the commutation angle of the stator voltage. Thus, FIG. 11(*b*) illustrates that the commutation margin remains constant as shown by line 460 which is above the threshold shown as $\beta_T$ until the commutation margin analog output signal drops below the reference voltage as shown by dashed line 450, at which point, the trigger angle, $\beta_m$, is then increased in order to increase the commutation margin angle of the converter. Thus, the increase in $\beta_m$ is illustrated by that portion of the wave shown as 462 in FIG. 11(e). Since the CM' signal approaches a minimum level as shown in 11(d), $\beta_m$, as shown in 11(e), likewise approaches maximum level. The $\beta_m$ is then applied to modulate the sawtooth wave produced by sawtooth wave generator 118 to produce a pulse width modulation control signal which appears on lead 126 of FIG. 5.

Figure 12:
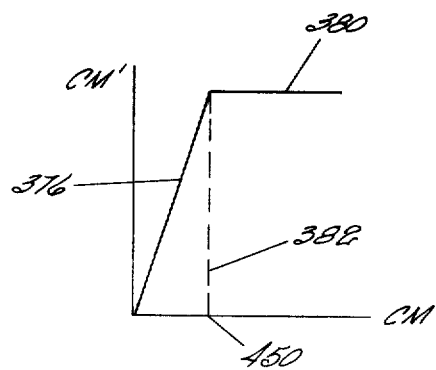
FIG. 12 is the transfer function of the nonlinear amplifier shown in FIG. 9.

The transfer function of the nonlinear amplifying means 412 is illustrated in FIG. 12. The function has CM, which is the input to the amplifier 412, is the X axis and CM', the output of the amplifier 412, is the Y axis. When the commutation margin analog output signal is between zero and a predetermined level indicated at this point 450 on CM axis, the output CM' of the nonlinear amplifying means 412 is proportional to the magnitude of the signal as shown by line 376. When the commutation margin analog output signal exceeds the predetermined level which is in excess of point 450 shown by dashed line 382, the output of the amplifier designated by CM' and shown by line 380 is at a constant high level output signal.

Referring again to FIG. 9, the commutation margin signal output of NOR gate 402 is applied to an input and to an insufficient commutation margin detecting circuit 415 which generates an output control pulse which represents that insufficient commutation angles $\beta_m - \mu_m$ exist in the converter. In the embodiment illustrated in FIG. 9, the insufficient commutation margin detecting circuit includes a monostable multi-vibrator 416 which is adapted to have a variable pulse width digital signal applied as an input thereto wherein the width of the digital pulse is representative of the commutation margin or the difference between the trigger angle of the stator current with respect to the stator voltage and the angle required for current to transfer from one phase to another phase of the motor. The variable pulse width digital pulse is applied to one input of an AND gate 418 and the other input of AND gate 418 is the output of the monostable multi-vibrator 416. In operation, the variable pulse width digital pulse is applied concurrently to the trigger input of the monostable multi-vibrator 416 and to the AND gate 418. The monostable multi-vibrator resistor-capacitor time constant is selected to provide an output pulse width which is equal to the minimum width of the variable pulse width digital signal for sufficient commutation margin angle. If the width of the variable pulse width digital signal is less than the minimum width required for sufficient commutation margin angle, the controlled digital pulse produced by the monostable multi-vibrator 416 will be passed by AND gate 418 and produce an output control digital pulse designated as $I_{cm}$ which represents that there is an insufficient commutation angle. The output $I_{cm}$ is then used as an override command signal to control the circuitry to shut the controlled synchronous motor off within a fraction of a cycle to avoid commutation failure which would result in excessive motor or power supply current.

Figure 13:
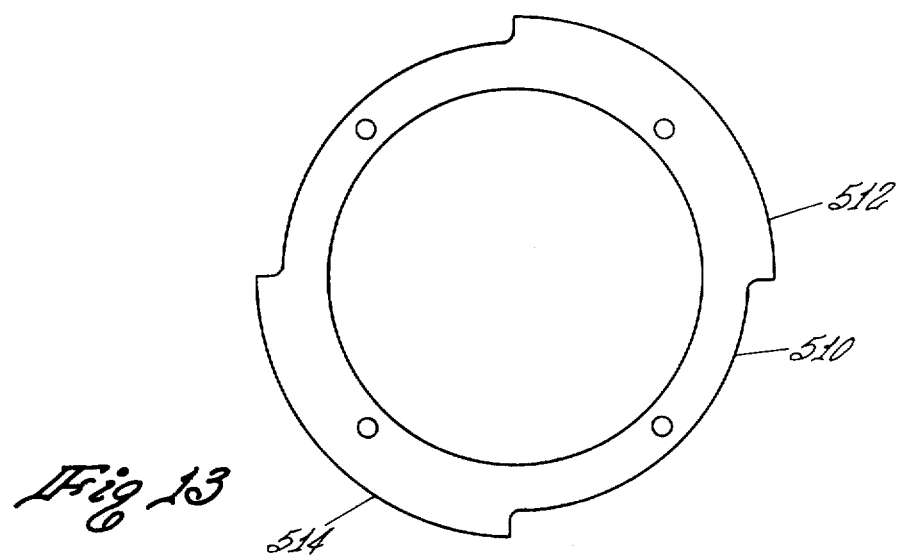
FIG. 13 is a front view of a rotor position sensor lobed rotor.
Figure 14:
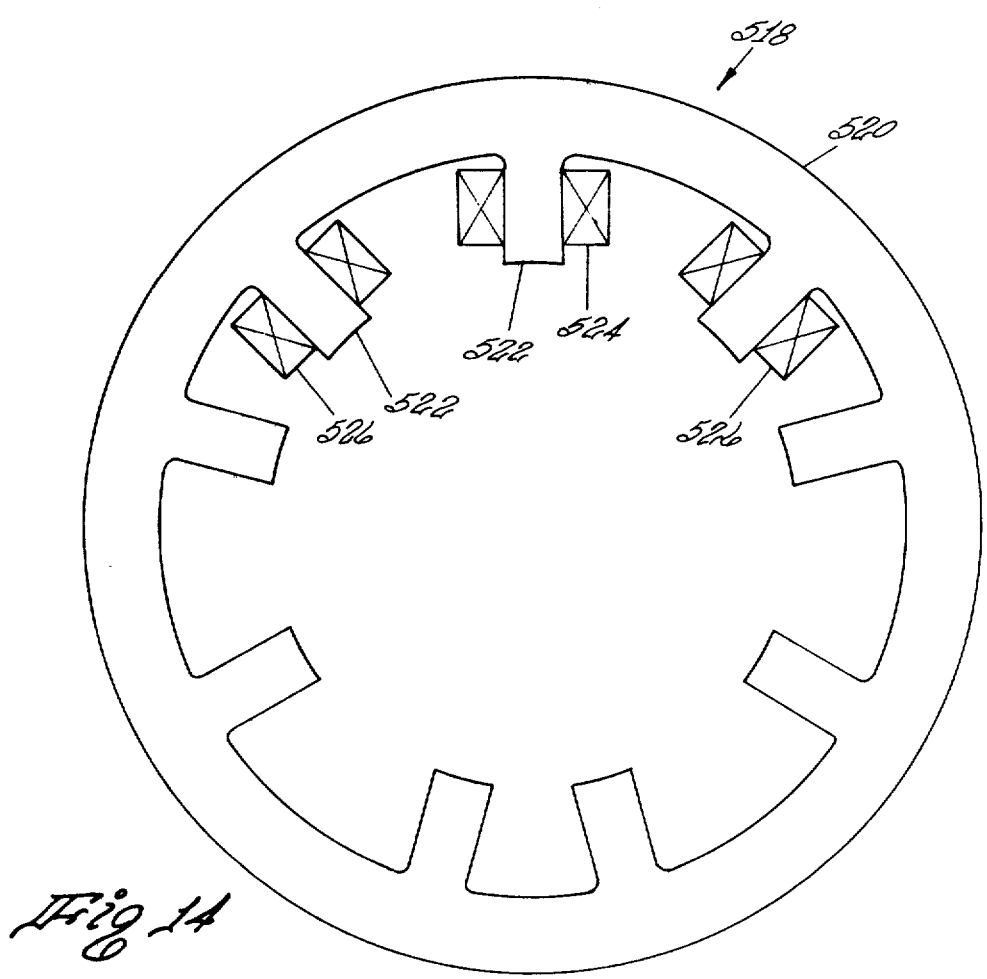
FIG. 14 is a front view of a rotor position sensor stator showing the variable reluctance transformer windings.

FIGS. 13 and 14 disclose the mechanical details of the polyphase motor shaft position sensor for detecting the position of a synchronous motor shaft relative to the motor frame with an angular resolution in electrical degrees equal to 360 degrees divided by two times the number of motor phases. In the embodiment illustrated in FIGS. 13 and 14, the polyphase motor shaft position sensor includes a shaft position sensor stator 518 which is attached to the motor frame. The stator 518 consists of transformers comprising a primary winding 524 and two secondary windings shown as 526. The windings are placed on annular-shaped permeable core 520 which has a plurality of extended legs 522 in the inner periphery thereof. The number of extended legs 522 is equal to three times the number of phases of the motor. The number of transformers, each with one primary winding and two secondary windings, is equal in number to the number of phases of the controlled synchronous motor. Each transformer consists of the primary winding 524 which is centered between the two secondary windings 526, and the angle of separation is equal to 360 electrical degrees divided by the number of motor pole pairs.

The polyphase motor shaft position sensor includes a shaft position sensor rotor 510 which is adapted to be attached to the motor shaft. The rotor 510 is fabricated from a magnetically permeable material and has a number of raised lobes such as lobes 512 and 514. The number of lobes on the shaft position sensor rotor 510 is equal in number to the number of motor pole pairs.

The lobed rotor 510 cooperates with the primary winding 524 and the secondary windings 526 of each shaft position sensor stator transformer to produce a null, or a zero secondary voltage output, when the lobed rotor 510 is centered on the stator transformer primary winding 522 or when the gap between the rotor lobes is centered on the stator transformer primary winding shown on extended leg 522.

Figure 15:
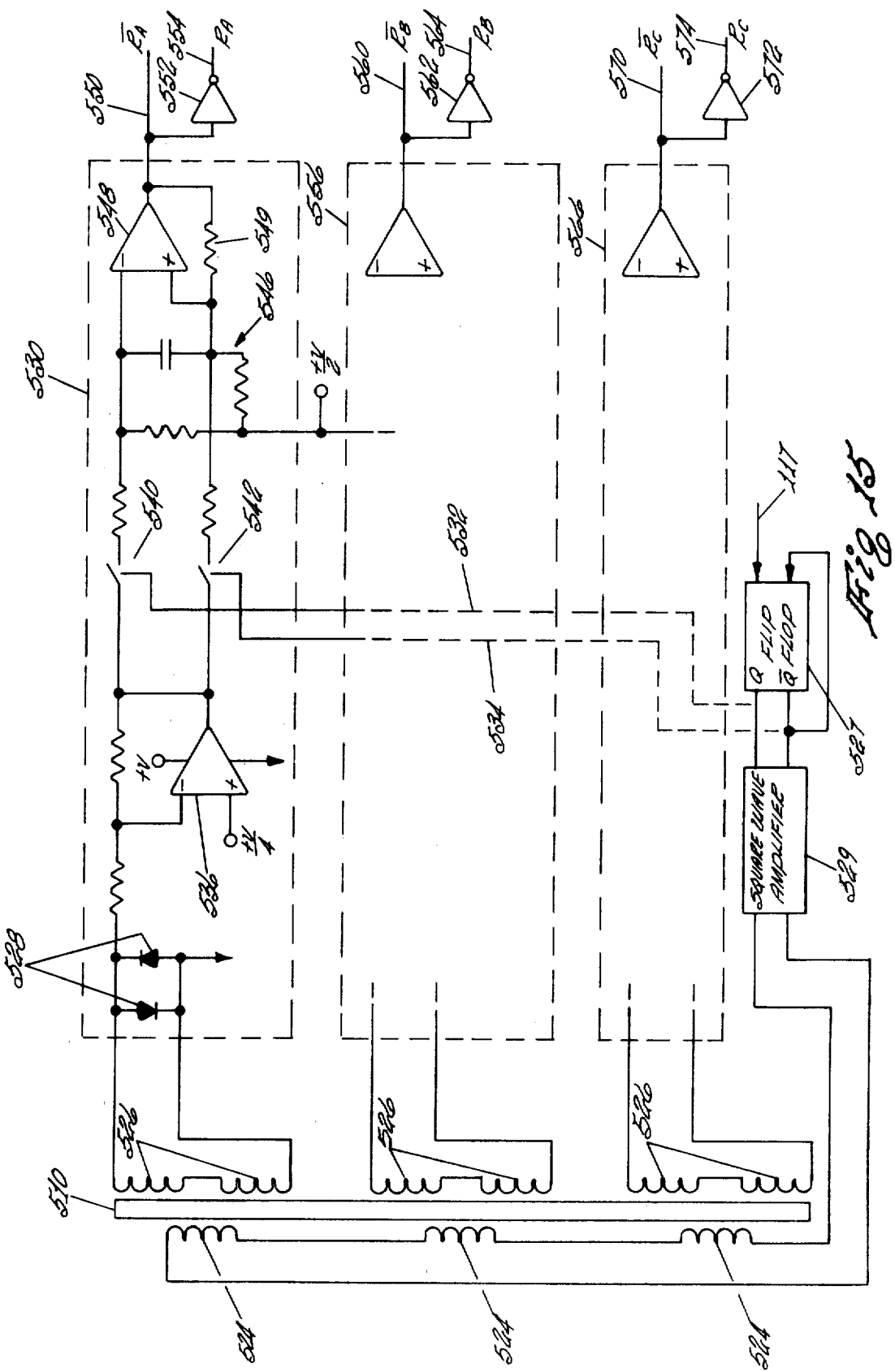
FIG. 15 is a schematic diagram partially in block form showing a rotor position sensing detector circuit.

FIG. 15 illustrates the three primary windings 524 of each of the stator transformers being connected in series and the two secondary windings 526 of each of the stator transformer windings being connected in series opposition. The lobed rotor is illustrated by rectangle designated as 510 in FIG. 15. Each of the secondary windings 526 of each stator transformer is electrically connected to apply the signals generated by the transformer to a rotor position sensing detecting circuit. In FIG. 15, a single rotor detection circuit 530 is illustrated for one phase. However, each of the other two phases has a similar circuit indentified as 556 and 566 which need not be described herein.

Figure 16:
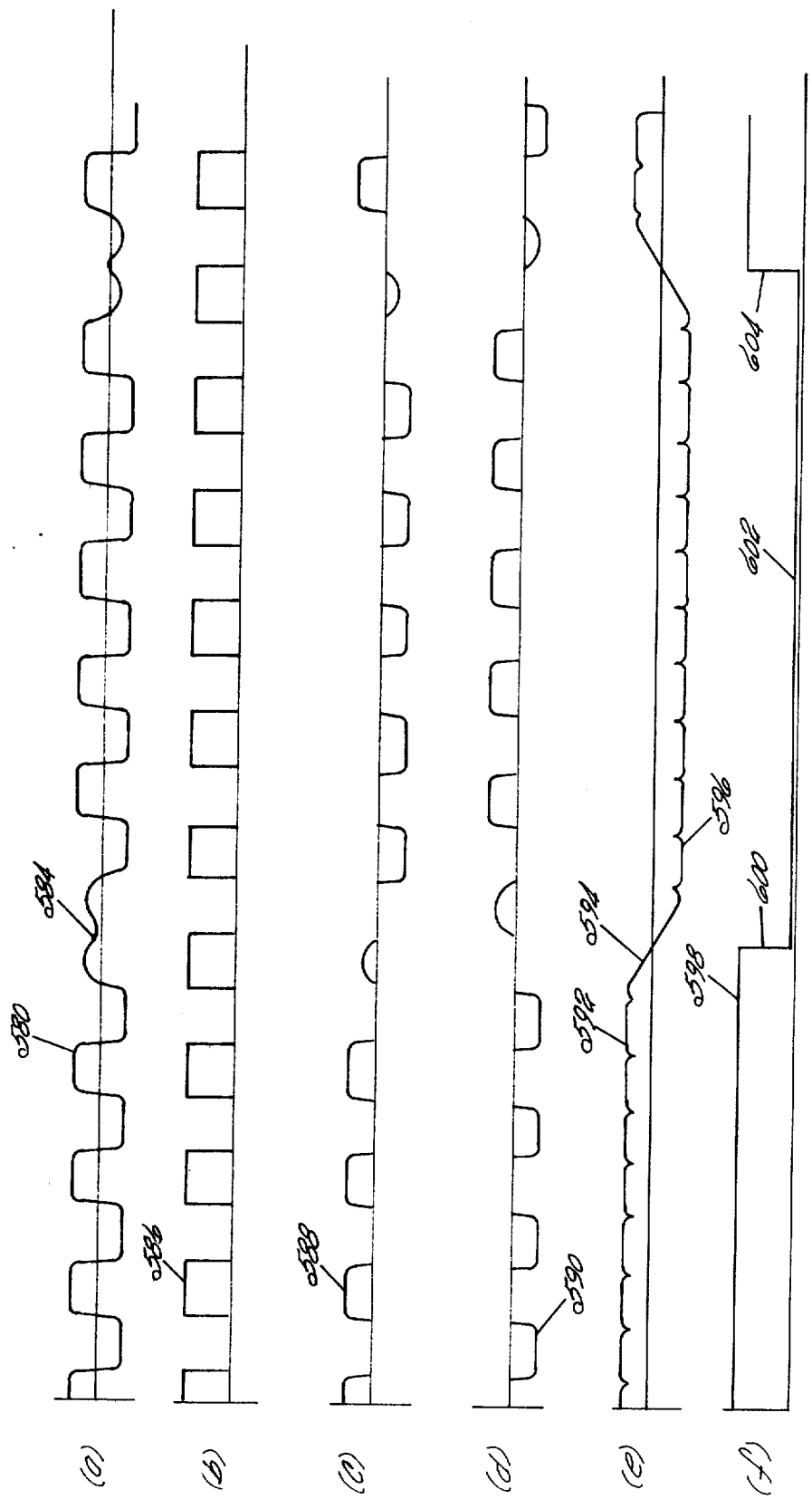
FIG. 16 are waveforms of various points in the rotor position sensing detecting circuits of FIG. 15.

In FIG. 15, the primary winding excitation is a square wave voltage signal having a predetermined amplitude and frequency. This excitation is provided by amplifier 529 which is driven by flip-flop 527 which is, in turn, actuated by the clock generator 116 illustrated in FIG. 5 and represented by lead 117. In FIG. 5, the clock generator 116 produces an output signal at a predetermined amplitude, frequency and duration. The clock pulse appearing on lead 117 is applied to a flip-flop 527. Each clock pulse triggers the flip-flop and causes the flip-flop 527 to change its state. Thus, flip-flop 527 is a frequency divider producing a bipolar output clocking signal which appears on both output leads of flip-flop 527. The clocking signals designated as Q and $\bar{Q}$, are applied to a square wave amplifier 529 and a pair of clocking leads 532 and 534. The square wave amplifier 529 is responsive to each change in state of flip-flop 527 to drive the primary winding 524 with a square wave pulse. The square wave pulse applied to the primary winding is coupled to the secondary windings 526, with the degree of coupling to the right and left-hand side coils of 526 determined by the position of the lobed rotor 510. The voltage appearing at the output of the opposed connected windings 526 is applied to a pair of diodes 528 which are connected antiparallel in shunt with the windings as a voltage limiter to form the square wave voltage output signal shown as voltage waveform 580 in FIG. 16(a). When the lobed rotor 510 reaches a null position, as illustrated by the transition portion of the waveform 584, the secondary voltage output of the position sensor transformer reverses phase as illustrated in FIG. 16(a). These phase reversals repeat for each of the three pairs of secondary windings every 180 electrical degrees of motor rotation. The so-produced square wave, illustrated in FIG. 16(a), is then applied as an input to a unity gain inverting buffer amplifier 536. Amplifier 536 applies a square wave output signal having a low source impedance to a synchronous rectifying means shown as two control switches 540 and 542 in FIG. 15. In the preferred embodiment, control switches 540 and 542 are metal oxide semiconductor field-effect transistors. The closing of the switches 540 and 542 is controlled by the oppositely-phased square wave reference signals appearing on leads 532 and 534 from the flip-flop 527. The reference signals alternate from the supply voltage (logic "1") to ground (logic "0"). The reference signal appearing on lead 532 closes control switch 540 when the reference signal is "1" and opens the switch when it is "0". The reference signal on lead 534 closes switch 542 when switch 540 is open and opens switch 542 when switch 540 is closed. Since the reference signals are derived from the same clock signal as the rotor position sensor primary winding excitation, the switches 540 and 542 each act as half wave synchronous rectifiers of the diode clipped and buffer amplified rotor position sensor secondary voltage.

In operation, when the signal from buffer amplifier 536 is at a high level, control switch 540 closes passing the amplifier output signal. When the signal from buffer amplifier 536 is low, control switch 542 is closed to apply the amplifier output from the control switch 542. The rectified position sensor signals passed by control switches 540 and 542 are illustrated in FIG. 16(c) as waveforms 588 for control switch 540 and as pulses 590 in FIG. 16(a) appearing from control switch 542. As noted by the waveforms in FIGS. 16(c) and 16(d), the rectified waveforms reverse polarity every 60 degrees due to the rotor lobe reaching a null position as it rotates with the shaft as described herein.

The synchronously rectified rotor position sensor signals are applied to a low pass RC filter 546. This filter passes the low frequency output component of the rectifiers, while greatly attenuating the rectifier ripple voltage and also any rectified noise voltages introduced into the rotor position sensor coils or cabling. The filtering means 546 introduces a phase shift in the rectified rotor position sensor signal of typically 5.0 degrees at the maximum motor frequency. The output signal appearing from the filtering means 546 is illustrated by waveform 16(e). The phase shifted, filtered modulated signal is applied as an input to a differential comparator 548. The differential comparator 548 has a positive feedback signal, the magnitude of which is established by resistor 549. The value of resistor 549 is selected to feedback about one percent (1%) of the supplied voltage as an input to the differential comparator 548 to insure a crisp, sharp transition from "0" to a "1" which occurs when the amplitude of the filtered signal reverses in phase as illustrated in FIG. 16(a). The waveform 592 is a positive amplitude signal and makes a transition from the positive amplitude to the negative amplitude as illustrated by transition waveform 594. A slight phase shift occurs during the transition illustrated by waveform section 594. When the amplitude of the filtered signal from the filtering means 546 is negative as illustrated in FIG. 16(e), the amplitude of the signal from the filtering means 546 remains negative until a subsequent transition point is reached wherein a slight phase shift is again induced and the output of the filtering means 546 then becomes positive. Differential comparator 548 is responsive to the transition of the magnitude of the filtered control signal to produce an output pulse which is either at a high level or a low level as illustrated by waveform 16(f). In the waveform of 16(f), when the filtered control signal is at a high level, the differential comparator 548 produces a high level signal on output 550 which is designated as $\overline{R}_A$. When the transition occurs as illustrated by transition portion of the waveform 594, FIG. 16(e), the output of the differential comparator 548 then drops to a low level as illustrated by waveform 602. The transition from the high level to the low level occurs at the phase angle where the transition section of the waveform 594 of FIG. 16(e) changes from the positive amplitude to a negative amplitude. Likewise, when the magnitude of the filtered control signal illustrated by waveform section 596 makes a transition from a negative amplitude to a positive amplitude, the output of the differential comparator 548 then makes a transition from a low level 602 to a high level illustrated as leading edge 604. An inverter 552 shown in FIG. 15 is connected to lead 550 to receive and invert the pulse so received from the differential comparator 548. Thus, output of lead 550 designated as $\overline{R}_A$, and the output 554 of inverter 552 is the inverted signal $R_A$ appearing on lead 550.

In a similar fashion, each of the rotor position detecting circuits 556 and 566 produces rotor digital timing signal pulses which are 120° phase shifted from each other. Thus, the signal appearing on lead 560 is designated as $\overline{R}_B$ and is inverted by inverter 562 to produce a 180° phase shifted signal on lead 564 designated as $R_B$. In the third phase, the signal appears on lead 570 which is designated as $\overline{R}_C$, and the signal appearing on lead 570 is inverted by inverter 572 and appears on output 574 as $R_C$. Each of the output signals designated on leads 550, 554, 560, 564, 570 and 574 are rotor digital timing signals having a duration of 180° each and the six so-produced rotor digital signals are applied as inputs to the 180° to 120° converter 195 illustrated in FIG. 5.

In connection with the discussion of FIG. 5, it was noted that at zero motor speed, there is an absence of load voltage derived digital gating timing signals and at low motor speeds, these digital gating timing signals will have large distortion induced therein by changes of current acting on the inductance of the synchronous motor. As further described in FIG. 5, the digital gating command signal generating means was responsive to the digital gating timing signals from each of the phase control mans and to the rotor digital timing signals for producing digital gating command signals wherein at zero motor speed and low motor speed the digital gating command signal generating means was responsive to the rotor digital timing signals such that the leading edge of the digital gating command signals was established by the leading edge of a selected one of the rotor digital timing signals until the motor reaches a speed wherein digital gating timing signals substantially free of distortion are produced by the phase control means.

When that occurs, the leading edge of the digital gating command signals is determined by one of the leading edges of the digital gating timing signals from the phase control means and the leading edge of a selected one of the rotor digital timing signals, whichever occurs first in time.

The waveforms of FIG. 17 illustrate the various waveforms during low speed, low voltage condition and for a higher speed, higher voltage condition.

Referring to waveform 17(a), at low motor speeds, the line-to-line voltage designated by $e_{ac}$ has the shape of the waveform 610. FIG. 17(b) shows a phase shifted stator reference voltage $e_a'$ which is the phasor voltage in the motoring mode illustrated in the phasor diagram of FIG. 6. The threshold voltage level is illustrated by dashed line 612. As illustrated in the waveform of 17(b), the resultant phasor voltage has a notch 614 having a bottom which is less than the magnitude of the threshold 612. When the combined phasor voltage $e_a'$ is negative, notch 611 is clearly below the threshold 612. The threshold voltage level 612 prevents comparator 200 in FIG. 5 from making a transition and, as such, prevents the comparator 200 from producing a false "1" as an output signal. However, the positive threshold at the input of comparator 200 increases the tendency for a false "0" output to occur in response to notch 614. Thus, in normal operation, comparator 200 would produce a false "0" when notch 614 drops below threshold 612. The output of comparator 200 is illustrated by waveform 17(c) and comprises two separate pulses 616 and 618. The output of comparator 200 is applied as one of the inputs to a NOR gate 230, the other input of which is a rotor digital timing signal which appears on lead 194. FIG. 17(d) illustrates the 120° rotor digital timing signal by waveform 620. Thus, NOR gate 230 is responsive to the so-produced pulses 616 and 618 to pass the rotor digital timing signal as the output pulse which is illustrated in FIG. 17(e) as waveform 622. The output of NOR gate 234 is illustrated as waveform 17(f) which is identical in width to the output of NOR gate 230 but is phase shifted 120°, which waveform is illustrated as waveform 624. The output of NOR gate 230 is applied by the lead 264 to one input of NOR gate 280. Likewise, the output of NOR gate 234 is inverted by inverter 254 and applied to the second input of NOR gate 280. The output signal appearing on lead 302 is represented by waveform 626 illustrated in FIG. 17(g). The rotor digital timing signals appearing on lead 306 are identical in shape but phase shifted 180°.

As the motor approaches high speed, the notches become relatively shallow as the magnitude of the stator reference voltage $e_a'$ increases. This is illustrated as waveform 632 in FIG. 17(h). The notches in waveform 632 are all above the threshold voltage which is represented by the dashed line 612. The output of comparator 200 with the notches above the threshold voltage is illustrated as waveform 634 in FIG. 17(i). Due to the fact that the reference voltage $e_a'$ is advanced in phase, the leading edge of the output of the comparator 200 is likewise advanced as illustrated by the leading edge of waveform 634. The rotor digital timing signal appearing on lead 194 for $R_A$ is illustrated as waveform 636 in FIG. 17(j). For this high speed case, the leading edge of the $R_A$ pulse occurs later and the trailing edge occurs earlier than the corresponding edges of the motor voltage derived logic signal $E_{+A}$. Thus, NOR gate 230 in FIG. 5 is responsive only to the output of comparator 200 and passes the same as the digital gating command signal in the form as illustrated by waveform 638 of FIG. 17(k). Similarly, the output of comparator 202 is a digital gating command signal which is phase shifted 120° as illustrated by waveform 640 in FIG. 17(l). The leading edge of the digital gating command signal is determined by the leading edge of the output from comparator 200 and the trailing edge thereof is determined by the leading edge of the next succeeding pulse illustrated as waveform 640 in FIG. 17(l). The resultant waveform is illustrated as waveform 642 in FIG. 17(m).

In summary, at zero or low motor speed, the rotor digital timing signal is used as the thyristor gate timing command signal. When the motor speed reaches a value where the distortion is substantially less, as illustrated when the notches in the resultant phasor voltage waveform exceed the comparator threshold voltage, the gate timing command signal is determined by a digital signal derived from a phase advanced motor voltage reference signal. As described hereinbefore, the digital gating command signals are applied to solid state power switching devices such as thyristors, to control the current applied to the stator of the controlled synchronous motor.

In utility, the use of the present invention permits a brushless self-controlled synchronous motor to operate from zero to maximum speed in a manner equivalent to that of a converter-fed DC motor. As the load increases on the synchronous motor, the commutation margin is continually controlled for optimum machine utilization. Similarly, in the event of a loss of adequate commutation margin in motoring or braking, the motor controller is responsive to the loss of commutation margin and reduces the machine and line currents to zero in a fraction of a cycle. The synchronous motor drive has wide application and utility for driving loads such as drill rig rotary tables, draw works, drilling mud pumps, mine hoists, mill drives and marine propulsion.

What is claimed is:

1. A self-controlled polyphase synchronous motor drive system for a synchronous motor having a rotor and a polyphase stator, said stator being adapted to have a polyphase voltage applied thereto, said motor drive system comprising
    means for producing rotor digital timing signals which are equal in number to two times the number of phases of the polyphase stator and representative of the position of the rotor relative to the stator;
    means for producing pulse width modulation control signals wherein the pulse width thereof is responsive to a motor power factor command signal;
    a plurality of phase control means equal in number to the number of phases of the polyphase stator and responsive to the pulse width modulation control signals, each of said phase control means having a selected two of the stator voltages applied as an input thereto and including means for producing a modulated analog reference signal from one of the two selected stator voltages and means for summing the amplitude modulated analog reference signal with an unmodulated analog reference signal produced from the other of the two selected stator voltages and for comparing the sum thereof with a threshold voltage signal to produce as an output therefrom two digital gating timing signals for each phase of the polyphase stator, each of said phase control means being responsive to the speed of a said synchronous motor such that an absence of digital gating timing signals occurs at zero motor speed and digital timing signals having distortion induced therein by changes of current acting on the inductance of the synchronous motor is produced at low motor speeds, said distortion being large compared to the stator voltage at low motor speeds and as the speed of the synchronous motor increases, the stator voltage increases in magnitude such that said distortion becomes smaller in magnitude relative to that of the stator voltage until the stator voltage level reaches a magnitude wherein the sum of the amplitude modulated analog reference signal and unmodulated analog reference signal exceeds the threshold level to produce digital timing signals substantially free of distortion;

a digital gating command signal generating means responsive to the digital gating timing signals from each of the phase control means and to the rotor digital timing signals for producing digital gating command signals wherein at zero motor speed and low motor speeds said digital gating command signal generating means is responsive to said rotor digital timing signals to have the leading edge of the digital gating command signals established by the leading edge of a selected one of the rotor digital timing signals until the motor speed reaches a speed wherein digital gating timing signals substantially free of distortion are produced by the phase control means whereupon the leading edge of the digital gating command signals is determined by one of the leading edges of one of the digital gating timing signals from the phase control means and the leading edge of a selected one of the rotor digital timing signals, whichever occurs first in time, and the width of the digital gating command signals is determined by the phase displacement of successive phases which is equal to 360 degrees divided by the number of phases of the polyphase stator, said digital gating command signals being applied to solid state controlled devices to control the current applied to the stator of the controlled synchronous motor.

2. The self-controlled polyphase synchronous motor drive system of claim 1 wherein the stator voltage responsive means is a voltage transformer.

3. The self-controlled polyphase synchronous motor drive system of claim 1 wherein the variable pulse width producing means includes
 a clock generator having an output clocking signal at a predetermined amplitude, frequency and duration;
 a ramp generator electrically connected to the clock generator and responsive to the output clocking signals for producing a sawtooth shaped ramp output signal which varies in amplitude between minimum and maximum threshold voltage levels; and
 a comparator electrically connected to the ramp generator to receive the sawtooth shaped ramp output signal and to receive a motor power factor command signal representing the power factor of the synchronous motor at a predetermined rotating speed to produce a constant amplitude, pulse width modulated control signal which is applied to the programmable switching means.

4. The self-controlled polyphase synchronous motor drive system of claim 3 wherein the programmable switching means includes logical AND gates having inputs from the comparator and mode signal representative of the motor being in at least one of a braking mode and a motor mode.

5. The self-controlled polyphase synchronous motor drive system of claim 4 wherein the first summing amplifier means are operational amplifiers which are responsive to the output of the AND gates and to a pulse width modulated stator voltage from a selected phase to produce at least one of an amplified modulated stator control voltage and an amplified modulated stator control voltage in response to the motor mode signal.

6. The self-controlled polyphase synchronous motor drive system of claim 5 wherein the second summing amplifier means are operational amplifiers which are responsive to one of the unmodulated stator reference voltage phase and to said motor mode signal for producing at least one of an amplified inverted unmodulated stator reference voltage from the other of the two selected phase and an amplified ummodulated stator reference voltage from the other of the two selected phase in response to the motor mode signal.

7. The self-controlled polyphase synchronous motor drive system of claim 6 wherein the digital responsive means are logical NOR gates, the inputs of which are derived from the digital timing signals from the comparator means and the digital timing signals representative of the rotor position relative to the stator.

8. The self-controlled polyphase synchronous motor drive system of claim 1 wherein the rotor position responsive means includes a variable reluctance transformer having a lobed rotor, an additive series connected primary and opposed series connected secondary winding.

9. The self-controlled polyphase synchronous motor drive system of claim 6 comprising
 a starting circuit operatively coupled to the comparator means to enable a controlled synchronous motor to be operated in a rectifier-inverter mode.

10. A self-controlled polyphase synchronous motor digital control system for removing distortion from a control signal applied to solid state controlled devices to control the current applied to the stator of a controlled synchronous motor comprising
 means responsive to the stator voltage of a controlled synchronous motor for producing analog load reference voltages representative of the amplitude and frequency of each phase of the stator of a synchronous motor;
 means for producing rotor digital timing signals which are equal in number to two times the number of phases of the polyphase stator representative of the position of the rotor relative to the stator;
 a plurality of phase control means equal in number to the number of phases of the polyphase stator, each of said phase control means having a selected two of the stator voltages applied as an input thereto and including means for producing a modulated analog reference signal from one of the two selected stator voltages and means for summing the amplitude modulated analog reference signal with an unmodulated analog reference signal produced from the other of the two selected stator voltages and for comparing the sum thereof with a threshold voltage signal to produce as an output therefrom two digital gating timing signals for each phase of the polyphase stator, each of said phase control means being responsive to the speed of a said synchronous motor such that an absence of digital gating timing signals occurs at zero motor speed and digital timing signals having distortion induced therein by changes of current acting on the inductance of the synchronous motor is produced at low motor speeds, said distortion being large compared to the stator voltage at low motor speeds and as the speed of the synchronous motor increases, the stator voltage increases in magnitude such that said distortion becomes smaller in magnitude relative to that of the stator voltage until the stator voltage level reaches a magnitude wherein the sum of the amplitude modulated analog reference signal and unmodulated analog reference signal exceeds the threshold level to produce digital timing signals substantially free of distortion;

a digital gating command signal generating means responsive to the digital gating timing signals from each of the phase control means and to the rotor digital timing signals for producing digital gating command signals wherein at zero motor speed and low motor speeds said digital gating command signal generating means is responsive to said rotor digital timing signals to have the leading edge of the digital gating command signals established by the leading edge of a selected one of the rotor digital timing signals until the motor speed reaches a speed wherein digital gating timing signals substantially free of distortion are produced by the phase control means whereupon the leading edge of the digital gating command signals is determined by one of the leading edges of one of the digital gating timing signals from the phase control means and the leading edge of a selected one of the rotor digital timing signals, whichever occurs first in time, and the width of the digital gating command signals is determined by the phase displacement of successive phases which is equal to 360 degrees divided by the number of phases of the polyphase stator, said digital gating command signals being applied to solid state controlled devices to control the current applied to the stator of the controlled synchronous motor.

11. A commutation margin sensing circuit for producing an analog signal representative of the difference between the trigger angle of a current applied to the polyphase stator of a synchronous motor and the commutation angle of the solid state controlled devices which control the current applied to the polyphase stator comprising a plurality of threshold comparators equal in number to twice the number of phases of the polyphase stator wherein the comparators are arranged in pairs and each comparator pair is adapted to receive as an input thereto an analog reference signal representative of a voltage between two selected phases of the polyphase stator, each of said pair of comparators being responsive to a first threshold signal applied as an input to one comparator of each comparator pair and second predetermined threshold voltage level applied as an input to the other comparator of each comparator pair said one of said comparator pair producing as an output therefrom a first and a second successive comparator output pulse for each phase of the voltage applied to the polyphase stator wherein the leading edge and trailing edge of each successive comparator output pulse established each time the amplitude of the stator voltage successively exceeds and then falls below the first threshold voltage level respectively wherein the commutation phase angle is represented by the time between the trailing edge of the first comparator output pulse and the leading edge of the second successive comparator output pulse from said one of said comparator pair, said other of said comparator pair producing as an output therefrom a first and a second successive comparator output pulse for each phase of the voltage applied to the polyphase stator wherein the leading edge and trailing edge of each successive comparator output pulse is established each time the amplitude of the stator voltage successively exceeds and then falls below the second threshold voltage level respectively wherein the commutation phase angle is represented by the time between the trailing edge of the first comparator output pulse and the leading edge of the second successive comparator output pulse from said other one of said comparator pair said comparator output pulse from said other of said comparator pair occurring later in time than the comparator output pulse from said one of said comparator pair a plurality of digital gating means equal in number to and operatively coupled to the output of each comparator to receive as one input thereto the comparator output pulse from a selected comparator and to receive as a second input thereto digital gating command signals which are concurrently applied to the solid state controlled devices, said digital gating command signals having a leading edge which is representative of the phase angle at the time the solid state controlled devices are rendered conductive and a width of said digital gating command signals is determined by the phase displacement of successive phases which is equal to 360 degrees divided by the number of phases of the polyphase stator;

each of said digital gating means being adapted to have comparator output pulses from a selected comparator and a selected one of said digital gate command signals applied as an input thereto wherein the trailing edge of the first comparator output pulse and the leading edge of the digital gating command signal occur in coincidence to enable said selected one of the digital gating means to produce as an output therefrom a digital commutation margin pulse having a duration which represents the difference in phase angle between the trigger angle and the commutation angle;

digital pulse selecting means operatively coupled to each of said plurality of digital gating means and responsive to each of said digital commutation margin pulse to produce a series of digital variable width output pulses equal in number to the number of comparators, each of said digital commutation margin pulses having a uniform predetermined amplitude and a width representative of the difference in phase angle between the trigger angle and commutation angle of each phase; and filtering means operatively coupled to said digital pulse gating means for receiving said series of digital variable width output pulses and averaging the same to produce an analog output signal representative of the commutation margin which is the difference in phase angle between the trigger angle and commutation angle of the controlled synchronous motor.

12. The commutation margin sensing circuit of claim 11 further comprising nonlinear amplifying means operatively coupled to said filtering means for receiving the commutation margin angle analog output signal as an input thereto and amplifying the same such that, when the magnitude of the commutation margin angle analog output signal is between a maximum level and a lower predetermined level, the nonlinear amplifying means output signal is a constant high level output signal, and, when said magnitude is between zero and said predetermined level, the magnitude of the nonlinear amplifying means output signal is proportional to the magnitude of the commutation margin angle analog output signal which is the input signal to the nonlinear amplifying means.

13. A self-controlled polyphase synchronous motor digital control system for removing distortion from a control signal applied to solid state controlled devices to control the current applied to the stator of a controlled synchronous motor comprising means responsive to the stator voltage of a controlled synchronous motor for producing analog load reference voltages representative of the amplitude and frequency of each phase of the stator of a synchronous motor;

means for producing rotor digital timing signals which are equal in number to two times the number of phases of the polyphase stator representative of the position of the rotor relative to the stator;

phase control means responsive to the analog load reference voltages for producing a modulated analog reference signal from one of the analog load reference signals and for summing the amplitude modulated analog reference signal with an unmodulated analog reference signal produced from one of the other analog load reference signal and for comparing the sum thereof with a threshold voltage signal to produce as an output therefrom digital gating timing signals, said phase control means being responsive to the speed of a said synchronous motor such that an absence of digital gating timing signals occurs at zero motor speed and digital timing signals having distortion induced therein by changes of current acting on the inductance of the synchronous motor is produced at low motor speeds, said distortion being large compared to the stator voltage at low motor speeds and, as the speed of the synchronous motor increases, the stator voltage increases in magnitude such that said distortion becomes smaller in magnitude relative to that of the stator voltage until the stator voltage level reaches a magnitude wherein the sum of the amplitude modulated analog reference signal and unmodulated analog reference signal exceeds the threshold level to produce digital timing signals substantially free of distortion;

digital gating command signal generating means responsive to the digital gating timing signals from the phase control means and to the rotor digital timing signals for producing digital gating command signals wherein at zero motor speed and low motor speeds, said digital gating command signal generating means substitutes said rotor digital timing signals for the digital gating command signal until the motor speed reaches a speed wherein digital gating timing signals substantially free of distortion are produced by the phase control means whereupon the leading edge of the digital gating command signals is determined by one of the leading edge of one of the digital gating timing signals from the phase control means and the leading edge of a selected one of the rotor digital timing signals, whichever occurs first in time, and the width of the digital gating command signals is determined by the phase displacement of successive phases which is equal to 360 degrees divided by the number of phases of the polyphase stator, said digital gating command signals being applied to solid state controlled devices to control the current applied to the stator of the controlled synchronous motor.

14. An insufficient commutation margin detecting circuit comprising means responsive to a series of variable pulse width digital signal wherein the variable pulse width signal represents the commutation margin which is the difference between the trigger angle of the stator current with respect to the stator voltage and the angle required for current to transfer from one phase of a motor to another phase of the motor;

a monostable multi-vibrator adapted to have said series of variable pulse width digital signals applied as an input thereto and responsive to the leading edge of said digital signals to produce a controlled digital pulse having a width which represents the minimum width of the variable pulse width digital signal for a sufficient commutation margin angle;

a logical AND gate responsive to said series of variable pulse width digital signals and to said controlled digital pulse to produce an output control digital pulse when the width of a variable pulse width digital signal is less than the width of the controlled digital pulse representing an insufficient commutation angle.

15. A method of blanking digital timing signals having distortion induced therein from spurious signals in a synchronous motor control system at zero motor speed and at low motor speeds with digital timing signals derived from a rotor position sensor comprising the steps of producing an analog stator reference voltage from a phase shifted stator reference voltage which contains distortions induced therein by current undulations in the stator windings of the motor, said analog stator reference voltage having a positive going portion and a negative going portion each of which contains distortions therein;

comparing the analog stator reference voltage with both a positive threshold voltage and a negative threshold voltage in phase voltage reference comparators to produce output signals having a transition which defines a leading edge, said negative threshold voltage having a value which inhibits passing of a signal by a comparator in response to distortions in the analog stator reference voltage at low speeds to avoid producing a positive stator current when the stator voltage is negative and said positive threshold voltage is responsive to the positive going portion of the analog stator reference voltage to pass a digital timing signal which has a false transition from one binary state to a second binary state induced therein by discontinuities in the positive going portion of the analog stator reference voltage which result in inhibiting of current flow in the stator winding when the stator voltage is positive;

producing digital rotor position timing signals from a rotor position sensor wherein said digital rotor position timing signals have a defined leading edge, a predetermined angular duration and remain at a selected binary state during the predetermined angular duration thereof; and logically passing the digital rotor position timing signals as the digital timing signals at low motor speeds when the leading edge of the phase voltage reference comparator output signal lags the leading edge of the digital rotor position timing signal until a motor speed is reached such that the leading edge of phase voltage reference comparator output signal is at least one of in phase with and leads the leading edge of the digital rotor position timing signal whereupon the phase voltage reference comparator output signal is logically passed as the digital timing signals.

* * * * *